US009352965B2

(12) United States Patent
Ohtani et al.

(10) Patent No.: US 9,352,965 B2
(45) Date of Patent: May 31, 2016

(54) METHOD AND APPARATUS FOR PRODUCING METAL OXIDE PARTICLES

(75) Inventors: Bunsho Ohtani, Sapporo (JP); Noriyuki Sugishita, Toyama (JP); Yasushi Kuroda, Toyama (JP)

(73) Assignees: NATIONAL UNIVERSITY CORPORATION HOKKAIDO UNIVERSITY, Sapporo-shi (JP); SHOWA DENKO K.K., Tokyo (JP)

( * ) Notice: Subject to any disclaimer, the term of this patent is extended or adjusted under 35 U.S.C. 154(b) by 305 days.

(21) Appl. No.: 13/583,159

(22) PCT Filed: Mar. 7, 2011

(86) PCT No.: PCT/JP2011/055864
§ 371 (c)(1),
(2), (4) Date: Sep. 6, 2012

(87) PCT Pub. No.: WO2011/111848
PCT Pub. Date: Sep. 15, 2011

(65) Prior Publication Data
US 2012/0328508 A1    Dec. 27, 2012

(30) Foreign Application Priority Data
Mar. 8, 2010  (JP) ................. 2010-050815

(51) Int. Cl.
*C01G 23/07*  (2006.01)
*C01B 13/22*  (2006.01)
*C01G 1/02*  (2006.01)

(52) U.S. Cl.
CPC . *C01B 13/22* (2013.01); *C01G 1/02* (2013.01); *C01G 23/07* (2013.01); *C01P 2002/30* (2013.01); *C01P 2004/03* (2013.01); *C01P 2006/12* (2013.01); *C01P 2006/90* (2013.01)

(58) Field of Classification Search
CPC ...................................................... C01G 23/07
USPC ........................................................ 423/613
See application file for complete search history.

(56) References Cited

U.S. PATENT DOCUMENTS

| 3,069,281 A | 12/1962 | Wilson |
| 3,488,148 A | 1/1970 | Krinov et al. |

(Continued)

FOREIGN PATENT DOCUMENTS

| CA | 1043982 A | 12/1978 |
| EP | 1 619 168 A1 | 1/2006 |

(Continued)

OTHER PUBLICATIONS

International Search Report of PCT/JP2011/055864 dated Sep. 22, 2011.

(Continued)

*Primary Examiner* — Matthew E Hoban
*Assistant Examiner* — James Fiorito
(74) *Attorney, Agent, or Firm* — Sughrue Mion, PLLC

(57) ABSTRACT

There is provided a method and an apparatus for producing metal oxide particles, which produce metal oxide particles having a high photocatalytic activity with high yield. The method for producing metal oxide particles of the invention is characterized by including combining, in a reaction tube, a preheated metal chloride-containing gas with a preheated first gas which does not contain the metal chloride at a first junction to obtain a first combined gas, and combining the first combined gas with a preheated second gas which does not contain the metal chloride, at a second junction which is further downstream of the first junction, to obtain a second combined gas, wherein at least one of the metal chloride-containing gas and the first gas contains oxygen, and wherein the preheated metal chloride-containing gas is further heated in a region between the first junction and the second junction (referred to as first reaction zone), by combining the first gas with the metal chloride-containing gas at the first junction while setting the preheat temperature of the first gas at a temperature equal to or higher than the preheat temperature of the metal chloride-containing gas, and the first combined gas is further heated in a region downstream of the second junction by combining the second gas with the first combined gas at the second junction while setting the preheat temperature of the second gas at a temperature equal to or higher than the temperature of the first combined gas.

9 Claims, 3 Drawing Sheets

(56) References Cited

U.S. PATENT DOCUMENTS

| | | | |
|---|---|---|---|
| 2003/0082099 A1* | 5/2003 | Tanaka et al. | 423/613 |
| 2005/0271578 A1 | 12/2005 | Terada et al. | |
| 2007/0292321 A1 | 12/2007 | Plischke et al. | |
| 2010/0209334 A1 | 8/2010 | Kuroda et al. | |

FOREIGN PATENT DOCUMENTS

| | | |
|---|---|---|
| EP | 1 908 730 A1 | 4/2008 |
| EP | 2 221 277 A1 | 8/2010 |
| GB | 1034095 A | 6/1966 |
| GB | 1170924 | 11/1969 |
| JP | 41-3608 | 3/1941 |
| JP | 39-16611 | 8/1964 |
| JP | 41-3608 | 3/1966 |
| JP | 44-27289 | 11/1969 |
| JP | 46-811 | 1/1971 |
| JP | 2006-052099 A | 2/2006 |
| JP | 4145923 B2 | 9/2008 |
| JP | 2008-303126 A | 12/2008 |
| WO | 2010/023757 A1 | 3/2010 |
| WO | 2010/044263 A1 | 4/2010 |

OTHER PUBLICATIONS

Kusano Daisuke et al., "Preparation of Highly Active Titanium Oxide Photocatalyst Fine Particles by Vapor-phase Oxidation of Titanium Chloride (IV)", 98th Shokubai Toronkai (Catalyst Forum) Sep. 2006, Proceedings of Forum A, p. 234.

Hua Guy Yang et al., "Anatase $TiO_2$ Single Crystals with a Large Percentage of Reactive Facets", Nature, May 29, 2008, pp. 638-641, vol. 453.

Amano et al., "Decahedral Single-Crystalline Particles of Anatase Titanium(IV) Oxide with High Photocatalytic Activity", Chem. Mater. 2009, pp. 2601-2603, vol. 21, No. 13.

Japanese Office Action issued in Application No. 2010-050815 dated Aug. 26, 2014.

* cited by examiner

METHOD AND APPARATUS FOR PRODUCING METAL OXIDE PARTICLES

TECHNICAL FIELD

The present invention relates to a method and an apparatus for producing metal oxide particles, and more particularly, to a method and an apparatus for producing metal oxide particles which can produce metal oxide particles with high yield even when a raw material gas is supplied at a high flow rate.

Priority is claimed on Japanese Patent Application No. 2010-050815, filed on Mar. 8, 2010, the disclosures of which are incorporated herein by reference.

BACKGROUND ART

In recent years, attention has been paid to titanium oxide particles in the field of photocatalysis. For example, Patent Literatures 1 and 2 and Non-Patent Literatures 1 to 3 disclose titanium oxide particles which have a decahedral box-like shape and are mainly formed of anatase-type crystals (hereinafter, referred to as "decahedral titanium oxide particles").

Patent Literatures 1 and 2, and Non-Patent Literatures 1 and 3 describe that since decahedral titanium oxide particles have large surface areas per unit mass and have high crystallinity with fewer internal defects, the titanium oxide particles have high activity as photocatalysts. Furthermore, Non-Patent Literature 2 describes that decahedral titanium oxide particles have a high ratio of the highly reactive (001) plane and are promising as photocatalysts.

With regard to a method for producing decahedral titanium oxide particles, there is available, for example, a method of using a hydrothermal reaction using hydrofluoric acid described in Non-Patent Literature 2. However, this production method involves a constitution of using hydrofluoric acid, and is therefore not suited for production on an industrial scale.

The methods for producing decahedral titanium oxide particles described in Patent Literatures 1 and 2, and Non-Patent Literatures 1 and 3, are methods for producing titanium oxide particles ($TiO_2$) by introducing titanium tetrachloride ($TiCl_4$) vapor and oxygen ($O_2$) gas into a reaction tube, subsequently heating these gases from the outside of the reaction tube, and thereby inducing a reaction represented by the following reaction formula (1):

$$TiCl_4 + O_2 \rightarrow TiO_2 + 2Cl_2 \qquad (1)$$

When the production methods described above are used, a powder product containing titanium oxide particles can be obtained in the downstream side of the reaction tube. This powder product contains a large proportion of decahedral titanium oxide particles.

However, the production methods described in Patent Literatures 1 and 2 and Non-Patent Literatures 1 and 3 employ systems of heating titanium tetrachloride and oxygen gas, which are raw materials, from the outside of the reaction tube when the temperature of the raw material gas is to be rapidly raised to the temperature at which the thermal oxidation reaction of titanium tetrachloride proceeds. Therefore, when a raw material gas containing titanium tetrachloride and an oxidizing gas is used at a high flow rate, a thermal conductivity from the heat source at the outside of the reaction tube to the raw material gas inside the reaction tube is not secured to the extent required for complete consumption of titanium tetrachloride in the raw material gas through the thermal oxidation reaction, the reaction is not completed, and unreacted titanium tetrachloride remains behind in an area downstream of the reaction zone. As a result, there occurs a problem with a decrease in the yield of the powder product that is obtained.

[Patent Literature 1] Japanese Patent No. 4145923
[Patent Literature 2] Japanese Patent Application Laid-Open No. 2006-52099
[Non-Patent Literature 1] KUSANO Daisuke, TERADA Yoshihiro, ABE Ryu, and OHTANI Fumiaki, 98th Shokubai Toronkai (Catalyst Forum) (September, 2006), Proceedings of Forum A, p. 234
[Non-Patent Literature 2] Hua Gui Yang, et al., Nature, Vol. 453, p. 638-p. 641
[Non-Patent Literature 3] Amano F., et al., Chem. Mater., 21, 2601-2603 (2009)

DISCLOSURE OF INVENTION

The present invention was made under such circumstances, and it is an object of the invention to provide a method and an apparatus for producing metal oxide particles which can produce metal oxide particles having a high photocatalytic activity with high yield even when a raw material gas containing a metal chloride and an oxidizing gas is used at a high flow rate.

The inventors of the present invention found that when a metal chloride-containing gas containing a preheated metal chloride is combined, in a reaction tube, with a first gas which has been preheated to a temperature equal to or higher than the preheat temperature of this metal chloride-containing gas to heat the metal chloride-containing gas, and the combined gas which has been heated to a temperature equal to or higher than the preheat temperature of the metal chloride-containing gas, is further combined with a second gas which has been preheated to a temperature equal to or higher than the temperature of this combined gas to thereby further heat the gas, metal oxide particles can be produced with high yield even if a raw material gas containing a metal chloride and an oxidizing gas is used at a high flow rate. Thus, the inventors completed the following inventions.

In order to achieve the object described above, the present invention employs the following constitution. That is, (1) A method for producing metal oxide particles, the method including combining, in a reaction tube, a preheated metal chloride-containing gas with a preheated first gas which does not contain the metal chloride at a first junction to obtain a first combined gas, and combining the first combined gas with a preheated second gas which does not contain the metal chloride, at a second junction which is further downstream of the first junction to obtain a second combined gas, wherein at least one of the metal chloride-containing gas and the first gas contains oxygen, and wherein the preheated metal chloride-containing gas is further heated in a region between the first junction and the second junction (referred to as first reaction zone), by combining the first gas with the metal chloride-containing gas at the first junction while setting the preheat temperature of the first gas at a temperature equal to or higher than the preheat temperature of the metal chloride-containing gas, and the first combined gas is further heated in a region downstream of the second junction by combining the second gas with the first combined gas at the second junction while setting the preheat temperature of the second gas at a temperature equal to or higher than the temperature of the first combined gas.

(2) The method for producing metal oxide particles as described in the above item (1), wherein the metal chloride is titanium tetrachloride, and the metal oxide particles are titanium oxide particles.

(3) The method for producing metal oxide particles as described in the above item (2), wherein the titanium oxide particles are decahedral titanium oxide particles.

(4) The method for producing metal oxide particles as described in any one of the above items (1) to (3), wherein the preheat temperature of the metal chloride-containing gas is equal to or higher than 400° C. and equal to or lower than 800° C.

(5) The method for producing metal oxide particles as described in any one of the above items (1) to (4), wherein the temperature of the first combined gas is equal to or higher than 700° C. and equal to or lower than 850° C.

(6) The method for producing metal oxide particles as described in any one of the above items (1) to (5), wherein the temperature of the second combined gas is equal to or higher than 800° C. and equal to or lower than 1150° C.

(7) The method for producing metal oxide particles as described in any one of the above items (1) to (6), wherein the preheat temperature of the first gas is equal to or higher than 700° C. and equal to or lower than 850° C.

(8) The method for producing metal oxide particles as described in any one of the above items (1) to (7), wherein the preheat temperature of the second gas is equal to or higher than 950° C. and equal to or lower than 1200° C.

(9) The method for producing metal oxide particles as described in any one of the above items (1) to (8), wherein the metal chloride-containing gas contains nitrogen gas.

(10) The method for producing metal oxide particles as described in any one of the above items (1) to (9), wherein the first gas contains one or more gases selected from the group consisting of oxygen gas, nitrogen gas, argon and water vapor.

(11) The method for producing metal oxide particles as described in any one of the above items (1) to (10), wherein the second gas contains one or more gases selected from the group consisting of oxygen gas, nitrogen gas, argon and water vapor.

(12) The method for producing metal oxide particles as described in any one of the above items (1) to (11), wherein the concentration of titanium tetrachloride contained in the first combined gas is set at 0.1% to 15% by volume.

(13) The method for producing metal oxide particles as described in any one of the above items (1) to (12), wherein the time for which the first combined gas remains in the first reaction zone is adjusted to 30 to 400 milliseconds.

(14) The method for producing metal oxide particles as described in any one of the above items (1) to (13), wherein the Reynolds number of the second combined gas is adjusted to 10 to 10,000.

(15) An apparatus for producing metal oxide particles, the apparatus including a reaction tube, and preheating units that respectively preheat a metal chloride-containing gas, a first gas and a second gas, the reaction tube including a hollow outer cylinder, a second hollow inner cylinder that is inserted between a site in the upstream side of the hollow outer cylinder and a site in the middle of the hollow outer cylinder, and a first hollow inner cylinder that is inserted between a site in the upstream side of the second hollow inner cylinder and a site in the middle of the second hollow inner cylinder, wherein the second hollow inner cylinder has, in the upstream side, a first conduit for introducing the first gas that has been preheated, and the hollow outer cylinder has, in the upstream side, a second conduit for introducing the second gas that has been preheated, and wherein the preheated metal chloride-containing gas is introduced from the upstream side of the first hollow inner cylinder; the metal chloride-containing gas thus introduced is combined with the first gas that has been preheated, at the downstream end of the first hollow inner cylinder; and the combined gas can be further combined with the second gas that has been preheated, at the downstream end of the second hollow inner cylinder.

According to the constitution described above, there may be provided a method and an apparatus for producing metal oxide particles which can produce metal oxide particles having a high photocatalytic activity with high yield, even when a raw material gas containing a metal chloride and an oxidizing gas is used at a high flow rate.

The method for producing metal oxide particles of the invention is a method for producing metal oxide particles, including combining, in a reaction tube, a preheated metal chloride-containing gas with a preheated first gas which does not contain the metal chloride at a first junction to obtain a first combined gas, and combining the first combined gas with a preheated second gas which does not contain the metal chloride, at a second junction which is further downstream of the first junction to obtain a second combined gas. In this method, at least one of the metal chloride-containing gas and the first gas contains oxygen, and the preheated metal chloride-containing gas is further heated in a region between the first junction and the second junction, by combining the first gas with the metal chloride-containing gas at the first junction while setting the preheat temperature of the first gas at a temperature equal to or higher than the preheat temperature of the metal chloride-containing gas, whereas the first combined gas is further heated in a region downstream of the second junction by combining the second gas with the first combined gas at the second junction while setting the preheat temperature of the second gas at a temperature equal to or higher than the temperature of the first combined gas. Thereby, even when a raw material gas containing a metal chloride and an oxidizing gas is used at a high flow rate, metal oxide particles can be produced with high yield.

The method for producing metal oxide particles of the invention has a constitution in which the metal chloride is titanium tetrachloride, and the metal oxide particles are titanium oxide particles. Therefore, the method is a method for producing metal oxide particles, including combining, in a reaction tube, a preheated metal chloride-containing gas with a preheated first gas which does not contain the metal chloride at a first junction to obtain a first combined gas, and combining the first combined gas with a preheated second gas which does not contain the metal chloride, at a second junction which is further downstream of the first junction to obtain a second combined gas, wherein at least one of the metal chloride-containing gas and the first gas contains oxygen, and wherein the preheated metal chloride-containing gas is further heated in a region between the first junction and the second junction, by combining the first gas with the metal chloride-containing gas at the first junction while setting the preheat temperature of the first gas at a temperature equal to or higher than the preheat temperature of the metal chloride-containing gas, whereas the first combined gas is further heated in a region downstream of the second junction by combining the second gas with the first combined gas at the second junction while setting the preheat temperature of the second gas at a temperature equal to or higher than the temperature of the first combined gas. By this method, even when a raw material gas containing titanium tetrachloride and an oxidizing gas is used at a high flow rate, decahedral titanium oxide particles can be produced with high yield.

The apparatus for producing metal oxide particles of the invention includes a reaction tube, and preheating units that respectively preheat a metal chloride-containing gas, a first gas and a second gas, the reaction tube including a hollow outer cylinder, a second hollow inner cylinder that is inserted between a site in the upstream side of the hollow outer cylinder and a site in the middle of the hollow outer cylinder, and a first hollow inner cylinder that is inserted between a site in the upstream side of the second hollow inner cylinder and a site in the middle of the second hollow inner cylinder, wherein the second hollow inner cylinder has, in the upstream side, a first conduit for introducing the first gas that has been preheated, and the hollow outer cylinder has, in the upstream side, a second conduit for introducing the second gas that has been preheated, and wherein the preheated metal chloride-containing gas is introduced from the upstream side of the first hollow inner cylinder; the metal chloride-containing gas thus introduced is combined with the first gas that has been preheated, at the downstream end of the first hollow inner cylinder; and the combined gas can be further combined with the second gas that has been preheated, at the downstream end of the second hollow inner cylinder. Using this apparatus, even when the raw material gas containing a metal chloride and an oxidizing gas is used at a high flow rate, metal oxide particles can be produced with high yield.

DESCRIPTION OF EMBODIMENTS

Hereinafter, the method and apparatus for producing metal oxide particles as embodiments to which the present invention is applied will be described in detail with reference to the attached drawings. The drawings used for the following descriptions show the apparatuses concisely and schematically so as to make the features easier to understand, and thus the dimensional ratios of the respective constituent elements and the like are not consistent with the actual dimensional ratios.

<Apparatus for Production of Metal Oxide Particles>

Figure 1:
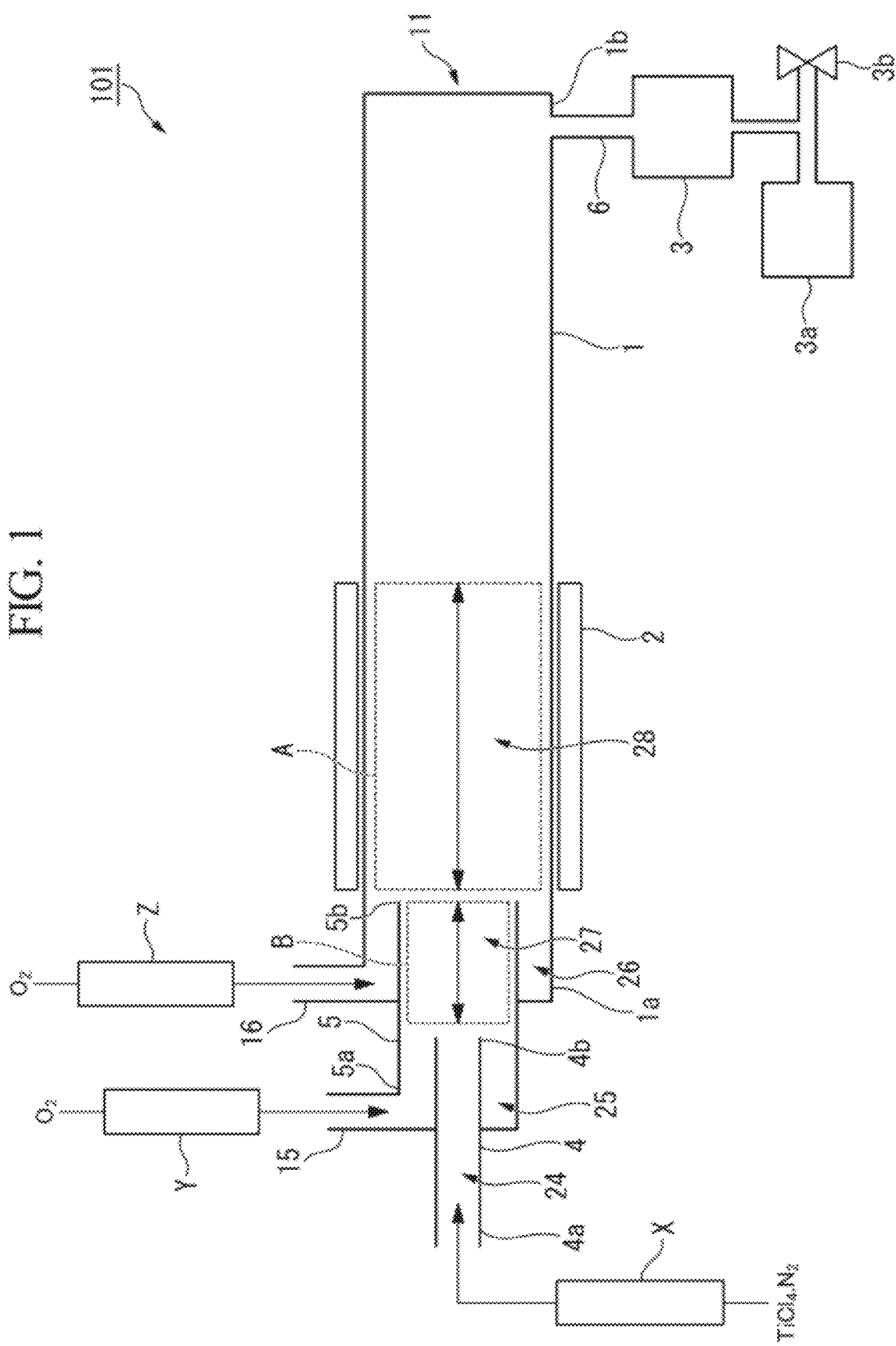
FIG. 1 is a schematic diagram showing an example of the apparatus for producing metal oxide particles of the invention.

FIG. 1 is a schematic diagram showing an example of the apparatus for producing metal oxide particles, which is an embodiment of the invention.

As shown in FIG. 1, the apparatus 101 for producing metal oxide particles, which is an embodiment of the invention, is approximately configured to include a reaction tube 11 composed of a hollow outer cylinder 1; a second hollow inner cylinder 5 that is inserted between a site in the upstream side (upstream area) 1a of the hollow outer cylinder 1 and a site in the middle of the hollow outer cylinder 1; and a first hollow inner cylinder 4 that is inserted between a site in the upstream side 5a of the second hollow inner cylinder 5 and a site in the middle of the second hollow inner cylinder 5, and to include an insulating material 2 disposed around the outside of the reaction tube 11 so as to maintain the temperature of a part of the reaction tube 11.

<Reaction Tube>

As shown in FIG. 1, the reaction tube 11 is configured to have a hollow outer cylinder 1, a first hollow inner cylinder 4 and a second hollow inner cylinder 5. The reaction tube 11 is constructed with, for example, cylindrical tubes formed of quartz or the like.

The second hollow inner cylinder 5 is inserted between a site in the upstream side 1a and a site in the middle of the hollow outer cylinder 1, and the downstream end 5b of the second hollow inner cylinder is disposed near the center in the longitudinal direction of the hollow outer cylinder 1.

The first hollow inner cylinder 4 is inserted between a site in the upstream side 5a and a site in the middle of the second hollow inner cylinder 5, and the downstream end 4b of the first hollow inner cylinder is disposed near the center in the longitudinal direction of the second hollow inner cylinder 5.

<Metal Chloride-Containing Gas>

The metal chloride-containing gas that has been preheated in a preheating region (preheating unit) X, is allowed to flow into the opening of the first hollow inner cylinder 24 in the upstream side 4a of the first hollow inner cylinder 4.

Although not depicted in the diagram, a vaporizer for evaporating metal chlorides such as titanium tetrachloride ($TiCl_4$) is installed in the upstream side of the preheating region X, and in the upstream side of this vaporizer, an inlet tube for introducing a liquid metal chloride into the vaporizer and an inlet tube for supplying a gas containing nitrogen are respectively connected to the vaporizer via valves. The temperature of the vaporizer is set at, for example, 165° C., so that the vaporizer vaporizes a liquid metal chloride into a metal chloride vapor. Thereby, the vaporizer is configured to be capable of supplying a metal chloride-containing gas composed of the metal chloride vapor and a mixed gas containing nitrogen, to the preheating region X.

The metal chloride-containing gas is a gas containing a vapor of titanium tetrachloride or the like. Specific examples of this metal chloride-containing gas that can be used include a mixed gas of a vapor of titanium tetrachloride or the like with nitrogen; a mixed gas of a vapor of titanium tetrachloride or the like with an inert gas containing nitrogen; a mixed gas composed of a vapor of titanium tetrachloride or the like, oxygen and nitrogen; a mixed gas composed of a vapor of titanium tetrachloride or the like, and an inert gas containing oxygen and nitrogen; and a mixed gas of a vapor of titanium tetrachloride with air. In addition, air may be partially included in a mixed gas composed of a vapor of titanium tetrachloride or the like, and an inert gas containing oxygen and nitrogen.

<First Gas>

A ring-shaped opening 25 is disposed between the downstream side of the first hollow inner cylinder 4 and the upstream side 5a of the second hollow inner cylinder 5, and a first gas that has been preheated in a preheating region (preheating unit) Y is allowed to flow into the opening.

The first gas is a gas which does not contain a metal chloride such as titanium tetrachloride, and when the metal chloride-containing gas contains oxygen, the first gas may not contain oxygen, but when the metal chloride-containing gas does not contain oxygen, the first gas contains oxygen. Specific examples of this first gas include oxygen ($O_2$), nitrogen, an inert gas such as argon, water vapor, and ozone ($O_3$), and these gases may be used individually, or may be used in a mixture. Therefore, examples that can be used include oxygen only, nitrogen only, argon only, a mixed gas of oxygen and an inert gas such as argon, a mixed gas of oxygen and water vapor, a mixed gas of oxygen, water vapor and an inert gas, and a mixed gas of water vapor and an inert gas. In addition, air may also be used as a mixed gas of oxygen and an inert gas.

<Second Gas>

A ring-shaped opening 26 is disposed between the downstream side of the second hollow inner cylinder 5 and the upstream side 1a of the hollow outer cylinder 1, and a second gas that has been preheated in a preheating region (preheating unit) Z is allowed to flow into the opening.

The second gas is a gas which does not contain a metal chloride such as titanium tetrachloride. Specific examples of the second gas include oxygen ($O_2$), nitrogen, an inert gas such as argon, water vapor, and ozone ($O_3$), and these gases may be used individually, or may be used in a mixture. Therefore, examples that can be used include oxygen only, nitrogen only, argon only, a mixed gas of oxygen and an inert gas such as argon, a mixed gas of oxygen and water vapor, a mixed gas of oxygen, water vapor and an inert gas, and a mixed gas of water vapor and an inert gas. In addition, air may also be used as a mixed gas of oxygen and an inert gas.

The first hollow inner cylinder 4 and the second hollow inner cylinder 5 are preferably constructed as coaxial structures. Thereby, the metal chloride-containing gas can be collected on the central axis side, while diffusion of titanium tetrachloride vapor toward the inner wall surface of the second hollow inner cylinder 5 can be suppressed, and thereby the generation of film-like products (side products) that deposit on the inner wall surface of the second hollow inner cylinder 5 can be suppressed.

The second hollow inner cylinder 5 and the hollow outer cylinder 1 are preferably constructed as coaxial structures. Thereby, diffusion of titanium tetrachloride vapor toward the inner wall surface of the hollow outer cylinder 1 can be suppressed, and thereby the generation of film-like products (side products) that deposit on the inner wall surface of the first hollow outer cylinder 1 can be suppressed.

<Insulating Material>

As shown in FIG. 1, an insulating material 2 is disposed around the outside of the reaction tube 11 for the purpose of maintaining the temperature of the gas inside the reaction tube. Conventional ceramic fibers are used as the insulating agent.

<First Junction>

The metal chloride-containing gas and the first gas are combined at the downstream end 4b of the first hollow inner cylinder 4. This junction of the two gases is referred to as a first junction.

<First Combined Gas>

The gas combined at the first junction is referred to as a first combined gas.

<Second Junction>

The first combined gas and the second gas are combined at the downstream end 5b of the second hollow inner cylinder 5. This junction of the two gases is referred to as a second junction.

<Second Combined Gas>

The gas combined at the second junction is referred to as a second combined gas.

<First Reaction Zone>

A region from the first junction (downstream end 4b of the first hollow inner cylinder 4) to the second junction (downstream end 5b of the second hollow inner cylinder 5), where the first combined gas passes through, is referred to as a first reaction zone. In the first reaction zone, a portion of the titanium tetrachloride vapor in the first combined gas is consumed by an oxidation reaction.

<Second Reaction Zone>

A region from the second junction (downstream end 5b of the second hollow inner cylinder 5) to the downstream end of the insulating material 2, where the second combined gas passes through, is referred to as a second reaction zone. In the second reaction zone, the titanium tetrachloride vapor in the second combined gas is consumed by an oxidation reaction.

<Preheating Region>

There are three preheating regions, X, Y and Z, provided in the apparatus 101 for producing metal oxide particles, which is an embodiment of the invention.

The preheating regions, X, Y and Z, are respectively configured to have an electric heater (not depicted) and the like arranged in the outside of the respective gas flow channels. In the preheating regions, X, Y and Z, the metal chloride-containing gas, the first gas, and the second gas are heated to the respective predetermined preheat temperatures.

The preheat temperature of the preheating region X (preheat temperature of the metal chloride-containing gas) is preferably set at a temperature in the range of equal to or higher than 400° C. and equal to or lower than 800° C., more preferably in the range of equal to or higher than 500° C. and equal to or lower than 750° C., and even more preferably in the range of equal to or higher than 600° C. and equal to or lower than 700° C. When the preheat temperature is set at a temperature in the range of equal to or higher than 400° C. and equal to or lower than 800° C., the proportion of decahedral titanium oxide particles in the powder product finally obtained is increased, and as a result, decahedral titanium oxide particles having high photocatalytic activity are obtained.

For example, in the case of using a gas containing titanium tetrachloride vapor and oxygen as the metal chloride-containing gas, when the preheat temperature at the preheating region X is raised to a temperature higher than 800° C., an oxidation reaction occurs between the titanium tetrachloride vapor and oxygen that flow inside the hollow inner cylinder 5, and titanium oxide particles are produced inside the hollow inner cylinder 5, while at the same time, there is a risk that film-like products may be produced on the inner wall surface of the hollow inner cylinder 5.

If the production of titanium oxide particles is continued in this state, the interior of the first hollow inner cylinder 4 becomes blocked up by the film-like products. For that reason, when the metal chloride-containing gas contains oxygen, the preheat temperature is preferably adjusted to a temperature at least lower than 800° C. On the contrary, when the preheat temperature of the preheating region X is adjusted to lower than 136° C., which is the boiling point of titanium tetrachloride, the titanium tetrachloride vapor may partially condense inside the hollow inner cylinder 4.

The preheat temperature of the preheating region Y (preheat temperature of the first gas) is a temperature equal to or higher than the preheat temperature of the preheating region X (preheat temperature of the metal chloride-containing gas) and is preferably set at a temperature in the range of equal to or higher than 700° C. and equal to or lower than 850° C., more preferably in the range of equal to or higher than 700° C. and equal to or lower than 800° C., and even more preferably in the range of equal to or higher than 750° C. and equal to or lower than 800° C.

When the metal chloride-containing gas is combined with the first gas while setting the preheat temperature of the first gas at a temperature equal to or higher than the preheat temperature of the metal chloride-containing gas, and thereby the metal chloride-containing gas that has been preheated in the preheating region X is further heated in the first reaction zone, the proportion of decahedral titanium oxide particles in the powder product finally obtained is high, and the photocatalytic activity is increased. On the contrary, when the preheat temperature of the first gas is set at a temperature lower than the preheat temperature of the metal chloride-containing gas, the proportion of decahedral titanium oxide particles in the powder product finally obtained is low, and the photocatalytic activity is decreased.

If the preheat temperature of the preheating region Y is in a temperature range of lower than 700° C., the proportion of decahedral titanium oxide particles in the resulting powder product is low, and the photocatalytic activity is low. If the preheat temperature of the preheating region Y is in a temperature range of higher than 850° C., the proportion of rutile in the resulting powder product increases, so that the proportion of decahedral titanium oxide particles is low, while the photocatalytic activity is decreased. When the preheat temperature of the first gas is set at a temperature in the range of equal to or higher than 700° C. and equal to or lower than 850° C., which is a temperature equal to or higher than the preheat temperature of the metal chloride-containing gas, the proportion of rutile in the powder product finally obtained decreases, and the proportion of decahedral titanium oxide particles is increased. As a result, decahedral titanium oxide particles having a high photocatalytic activity are obtained.

The preheat temperature of the preheating region Z (preheat temperature of the second gas) is a temperature equal to or higher than the preheat temperature of the preheating region Y (preheat temperature of the first gas), and is preferably set at a temperature in the range of equal to or higher than 950° C. and equal to or lower than 1200° C., more preferably in the range of equal to or higher than 1000° C. and equal to or lower than 1150° C., and even more preferably in the range of equal to or higher than 1050° C. and equal to or lower than 1100° C. When the first combined gas and the second gas are combined at the second junction while setting the preheat temperature of the second gas at a temperature equal to or higher than the temperature of the first combined gas, and thereby the first combined gas is further heated in the second reaction zone, even under the conditions in which the total flow rate of the metal chloride-containing gas, the first gas and the second gas (referred to as raw material gas flow rate) is a high flow rate, the oxidation reaction of the metal chloride can be efficiently carried out in the gas phase. For example, the oxidation reaction between titanium tetrachloride vapor and oxygen can be efficiently carried out so as to allow the reaction represented by the reaction formula (1) to proceed completely, and thereby a powder product can be obtained with high yield.

If the preheat temperature of the second gas is set at a temperature lower than the temperature of the first combined gas, the first combined gas is not further heated in the second reaction zone. Therefore, the oxidation reaction of the metal chloride cannot be efficiently carried out in the gas phase. For example, since the oxidation reaction between titanium tetrachloride vapor and oxygen does not efficiently proceed, under the conditions in which the raw material gas flow rate is a high flow rate, a powder product may not be obtained with high yield.

If the preheat temperature of the preheating region Z is in a temperature range of lower than 950° C., the temperature of the second combined gas, that is, the temperature of the second reaction zone, is lowered. Then, the reaction is not completed in the second reaction zone, and the yield of the resulting powder product may be decreased. If the preheat temperature of the preheating region Z is in a temperature range of higher than 1200° C., the proportion of rutile in the powder product finally obtained increases, and the proportion of decahedral titanium oxide is low. As a result, the photocatalytic activity is decreased.

When the preheat temperature of the second gas is set at a temperature in the range of equal to or higher than 950° C. and equal to or lower than 1200° C., which is a temperature equal to or higher than the temperature of the first combined gas, even under the conditions in which the raw material gas flow rate is a high flow rate, the oxidation reaction of the metal chloride can be efficiently carried out in the gas phase. For example, when the oxidation reaction between titanium tetrachloride vapor and oxygen as represented by the reaction formula (1) is efficiently carried out so that no unreacted titanium tetrachloride vapor remains behind in the downstream side of the second reaction zone, titanium oxide particles can be efficiently produced with high yield.

The production methods described in Patent Literatures 1 and 2 and Non-Patent Literatures 1 and 3 employ systems in which titanium tetrachloride and oxygen gas, which serve as raw materials, are heated from the outside of the reaction tube when the temperature of the raw material gas is rapidly raised to a temperature at which the thermal oxidation reaction of titanium tetrachloride proceeds. Therefore, when a raw material gas containing titanium tetrachloride and an oxidizing gas is used at a high flow rate, a thermal conductivity from the heat source at the outside of the reaction tube to the raw material gas inside the reaction tube is not secured to the extent required for complete consumption of titanium tetrachloride in the raw material gas through the thermal oxidation reaction, and there occurs a problem with incompletion of the reaction. On the other hand, the present invention employs a system which does not utilize thermal conduction from the outside of the reaction tube for heating the metal chloride-containing gas containing titanium tetrachloride, but heats the metal chloride-containing gas by combining, inside the reaction tube, the metal chloride-containing gas with a first gas and a second gas, which have been preheated to high temperatures. Since the present invention can efficiently carry out heating of a raw material gas containing titanium tetrachloride and an oxidizing gas, even under the conditions in which the raw material gas flow rate is a high flow rate, no unreacted titanium tetrachloride vapor remains behind in the downstream side of the second reaction zone, and as a result, titanium oxide particles such as decahedral titanium oxide particles can be efficiently obtained with high yield.

<Temperature of First Combined Gas>

In the reaction tube 11, a first reaction zone B is provided between the first junction (downstream end 4b of the first hollow inner cylinder 4) and the second junction (downstream end 5b of the second hollow inner cylinder 5). The first reaction zone B is a region in which a preheated metal chloride-containing gas and a preheated first gas are combined to form a first combined gas, and the first combined gas flows through until the first combined gas is combined with a second gas.

The temperature of the first combined gas is preferably set at a temperature in the range of equal to or higher than 700° C. and equal to or lower than 850° C., and more preferably equal to or higher than 750° C. and equal to or lower than 800° C. When the temperature of the first combined gas is set at a temperature in the range of equal to or higher than 700° C. and equal to or lower than 850° C., the proportion of decahedral titanium oxide particles in the powder product finally obtained is increased, and a high photocatalytic activity is obtained.

If the temperature of the first combined gas is lower than 700° C., the proportion of decahedral titanium oxide particles in the powder product finally obtained decreases, and the photocatalytic activity is lowered. If the temperature of the second combined gas is a temperature higher than 850° C., the proportion of rutile in the powder product finally obtained increases, and the photocatalytic activity is lowered.

The method for calculating the temperature of the first combined gas, $T_1$ [° C.], will be described by taking a case of using titanium tetrachloride and nitrogen as the metal chloride-containing gas, oxygen as the first gas, and oxygen as the second gas, as an example.

The calculation is carried out by the following formulas:

$$T_1 = Q_{d, first\ combined}/C_{first\ combined},$$

$$Q_{d, first\ combined} = Q_{reaction, titanium\ tetrachloride} + Q_{reaction, nitrogen} + Q_{first, oxygen},$$

$$Q_{reaction, titanium\ tetrachloride} = G_{reaction, titanium\ tetrachloride} \times Cp_{titanium\ tetrachloride} \times T_{reaction},$$

$$Q_{reaction, nitrogen} = G_{reaction, nitrogen} \times Cp_{nitrogen} \times T_{reaction},$$

$$Q_{first, oxygen} = G_{first, oxygen} \times Cp_{oxygen} \times T_{first},$$

$$C_{first\ combined} = G_{reaction, titanium\ tetrachloride} \times Cp_{titanium\ tetrachloride} + G_{reaction, nitrogen} \times Cp_{nitrogen} + G_{first, oxygen} \times Cp_{oxygen}$$

Here, $Q_{d,\ first\ combined}$ represents the total amount of heat [kcal] taken into the first junction by the metal chloride-containing gas and the first gas; $C_{first\ combined}$ represents the heat capacity [kcal/° C.] of the first combined gas; $Q_{reaction,\ titanium\ tetrachloride}$ represents the amount of heat [kcal] taken into the first junction by titanium tetrachloride in the metal chloride-containing gas; $Q_{reaction, nitrogen}$ represents the amount of heat [kcal] taken into the first junction by nitrogen in the metal chloride-containing gas; $Q_{first,\ oxygen}$ represents the amount of heat [kcal] taken into the first junction by oxygen in the first gas; $G_{reaction,\ titanium\ tetrachloride}$ represents the mass flow rate [kg/h] of titanium tetrachloride in the metal chloride-containing gas; $Cp_{titanium\ tetrachloride}$ represents the specific heat [kcal/(kg·° C.)] of titanium tetrachloride; $T_{reaction}$ represents the preheat temperature of the metal chloride-containing gas; $G_{reaction, nitrogen}$ represents the mass flow rate [kg/h] of nitrogen in the metal chloride-containing gas; $Cp_{nitrogen}$ represents the specific heat [kcal/(kg·° C.)] of nitrogen; $G_{first,\ oxygen}$ represents the mass flow rate [kg/h] of oxygen in the first gas; $Cp_{oxygen}$ represents the specific heat [kcal/(kg·° C.)] of oxygen; and $T_{first}$ represents the preheat temperature [° C.] of the first gas. The calculation is carried out by defining $Cp_{titanium\ tetrachloride} = 0.6$ [kcal/(kg·° C.)], $Cp_{oxygen} = 1.1$ [kcal/(kg·° C.)], and $Cp_{nitrogen} = 1.2$ [kcal/(kg·° C.)].

<Temperature of Second Combined Gas>

In the reaction tube 11, a second reaction zone A is provided between the downstream end 5b of the second hollow inner cylinder 5 and the downstream end of the insulating material 2.

The second reaction zone A is a region in which the first combined gas and a preheated second gas are combined to form a second combined gas, and the second combined gas flows through. According to the present embodiment, the second reaction zone is a region in which the insulating material 2 is wound around the outside of the hollow outer cylinder 1, and by winding the insulating material around the region, the temperature of the gas inside the reaction tube 11 in the second reaction zone is maintained. The temperature of the second combined gas is preferably set at a temperature in the range of equal to or higher than 800° C. and equal to or lower than 1150° C., more preferably in the range of equal to or higher than 850° C. and equal to or lower than 1050° C., and even more preferably in the range of equal to or higher than 900° C. and equal to or lower than 1000° C. When the temperature of the second combined gas is set at a temperature in the range of equal to or higher than 800° C. and equal to or lower than 1150° C., the oxidation reaction of the metal chloride can be efficiently carried out in the gas phase.

For example, the oxidation reaction between titanium tetrachloride vapor and oxygen as represented by the reaction formula (1) is efficiently carried out, and thereby titanium oxide particles can be efficiently produced.

If the temperature of the second combined gas is lower than 800° C., the previously described oxidation reaction between titanium tetrachloride vapor and oxygen as represented by the reaction formula (1) does not completely proceed, and unreacted titanium tetrachloride vapor remains behind in the downstream side of the second reaction zone, so that the yield of the powder product may decrease. Furthermore, if the temperature of the second combined gas is higher than 1150° C., transition from the anatase crystal structure to the rutile crystal structure proceeds, so that the proportion of rutile is increased. Thereby, the photocatalytic activity of the titanium oxide particles is decreased. When the second combined gas passes through the second reaction zone A, heat dissipation to the outside of the reaction tube occurs, so that the metal oxide produced in the combined gas is rapidly cooled, and metal oxide particles having a predetermined particle size are produced.

The method for calculating the temperature of the second combined gas, $T_2$ [° C.], will be described by taking a case of using titanium tetrachloride and nitrogen as the metal chloride-containing gas, oxygen as the first gas, and oxygen as the second gas, as an example.

The calculation is carried out by the following formulas:

$$T_2 = Q_{d, second\ combined}/C_{second\ combined},$$

$$Q_{d, second\ combined} = Q_{first\ combined, titanium\ tetrachloride} + Q_{first\ combined, nitrogen} + Q_{second, oxygen},$$

$$Q_{first\ combined, titanium\ tetrachloride} = G_{first\ combined, titanium\ tetrachloride} \times Cp_{titanium\ tetrachloride} \times T_1,$$

$$Q_{first\ combined, nitrogen} = G_{first\ combined, nitrogen} \times Cp_{nitrogen} \times T_1,$$

$$Q_{second, oxygen} = G_{second, oxygen} \times Cp_{oxygen} \times T_{second},$$

$$C_{second\ combined} = G_{first\ combined, titanium\ tetrachloride} \times Cp_{titanium\ tetrachloride} + G_{first\ combined, nitrogen} \times Cp_{nitrogen} + G_{second, oxygen} \times Cp_{oxygen}$$

Here, $Q_{d,\ second\ combined}$ represents the total amount of heat [kcal] taken into the second junction by the first combined gas and the second gas; $C_{second\ combined}$ represents the heat capacity [kcal/° C.] of the second combined gas; $Q_{first\ combined, titanium\ tetrachloride}$ represents the amount of heat [kcal] taken into the second junction by titanium tetrachloride in the first combined gas; $Q_{first\ combined, nitrogen}$ represents the amount of heat [kcal] taken into the second junction by nitrogen in the first combined gas; $Q_{second,\ oxygen}$ represents the amount of heat [kcal] taken into the second junction by oxygen in the second gas; $G_{first\ combined, titanium\ tetrachloride}$ represents the mass flow rate [kg/h] of titanium tetrachloride in the first combined gas; $G_{first\ combined,\ nitrogen}$ represents the mass flow rate [kg/h] of nitrogen in the first combined gas; $G_{second,\ oxygen}$ represents the mass flow rate [kg/h] of oxygen in the second gas; and $T_{second}$ represents the preheat temperature [° C.] of the second gas. The calculation is carried out by defining $Cp_{titanium\ tetrachloride}=0.60$ [kcal/(kg·° C.)], $Cp_{oxygen}=1.1$ [kcal/(kg·° C.)], and $Cp_{nitrogen}=1.2$ [kcal/(kg·° C.)].

<Product Recovery Unit>

The downstream side 1b of the hollow outer cylinder 1 is connected to a product recovery unit 3 that recovers products such as metal oxide particles, via a discharge tube 6. The product recovery unit 3 is formed from a bag filter or the like, and can recover the produced metal oxide particles.

In addition, there are an exhaust pump 3a and a pressure regulator valve 3b connected to the downstream side of the product recovery unit 3. Conventionally, as products collect in the product recovery unit 3, and the filter becomes clogged, the pressure inside the reaction tube 11 increases. By performing suction with an exhaust pump 3a, this pressure increase can be suppressed, and the oxidation reaction to a metal oxide can be carried out at near ambient pressure. At this time, it is preferable to regulate the suction power of the exhaust pump 3a by controlling the pressure regulator valve 3b. Thereby, metal oxide particles can be more efficiently produced.

In the case of using titanium tetrachloride as the metal chloride, the metal oxide particles recovered at the product recovery unit 3 are obtained as decahedral titanium oxide particles, or as titanium oxide particles other than decahedral titanium oxide particles.

Decahedral titanium oxide particles mean titanium oxide particles having a decahedral box-like shape, as defined in Patent Literature 1.

Furthermore, titanium oxide particles other than decahedral titanium oxide particles mean those that are not defined as the decahedral titanium oxide particles, among the titanium oxide particles obtained by the production method of the present embodiment.

<Method for Production of Metal Oxide Particles>

Next, the method for producing metal oxide particles according to an embodiment of the invention will be described, with reference to the apparatus 101 for producing metal oxide particles shown in FIG. 1.

The method for producing metal oxide particles according to an embodiment of the invention includes a step of respectively preheating a metal chloride-containing gas containing a metal chloride, a first gas that does not contain the metal chloride, and a second gas that does not contain the metal chloride (hereinafter, referred to as a preheating step); combining the metal chloride-containing gas with the first gas to form a first combined gas, and allowing a portion of the metal chloride to react in a first reaction zone (first reaction step); and combining the first combined gas with the second gas to form a second combined gas, and allowing the rest of the metal chloride to react in a second reaction zone (second reaction step).

Hereinafter, a case of producing titanium oxide as the metal oxide particles using titanium tetrachloride as the metal chloride, will be described.

<Preheating Step>

A metal chloride-containing gas that has been preheated to a certain preheat temperature in the preheating region X is allowed to flow into the first hollow inner cylinder 4 through the upstream side 4a.

A mixed gas composed of oxygen, nitrogen and water vapor (first gas), which has been preheated to a certain preheat temperature in the preheating region Y, is allowed to flow into the ring-shaped opening 25 between the first hollow inner cylinder and the second hollow inner cylinder.

A mixed gas composed of oxygen, nitrogen and water vapor (second gas), which has been preheated to a certain preheat temperature in the preheating region Z, is allowed to flow into the ring-shaped opening 26 between the second hollow inner cylinder and the hollow outer cylinder 1.

<First Reaction Step>

The metal chloride-containing gas ejected through the downstream end 4b of the first hollow inner cylinder 4 is combined with the first gas ejected through the ring-shaped opening 25 at the downstream end 4b of the first hollow inner cylinder 4 to form a first combined gas. That is, the downstream end 4b of the first hollow inner cylinder 4 serves as a junction (first junction).

The oxidation reaction of the reaction formula (1) proceeds at the temperature of the first combined gas in the first reaction zone, and a portion of titanium tetrachloride is consumed in the first reaction zone B.

<Second Reaction Step>

In the second reaction zone A, the oxidation reaction of the reaction formula (1) proceeds at the temperature of the second combined gas to convert titanium tetrachloride to titanium oxide. When the second combined gas passes through the second reaction zone A, the metal oxide in the combined gas is rapidly cooled, and a powder product composed of titanium oxide particles is produced.

In order to produce metal oxide particles such as decahedral titanium oxide particles having a high photocatalytic activity, with high yield even under the conditions in which the raw material gas flow rate is a high flow rate, it is preferable to allow a portion of titanium tetrachloride to react by the oxidation reaction in the first reaction step, with the temperature of the first combined gas set at a temperature equal to or higher than 750° and equal to or lower than 850° C., subsequently combining a second gas that has been preheated to a temperature between 950° C. and 1200° C. with the first combined gas, and completely consuming the portion of titanium tetrachloride remaining unreacted in the first reaction step, through the oxidation reaction by heating the first combined gas efficiently.

The time for which the second combined gas remains in the second reaction zone A is preferably in the range of less than 600 milliseconds, more preferably less than 400 milliseconds, and even more preferably less than 300 milliseconds. If the length of the insulating material 2 in the direction of the reaction tube axis is increased, and the time for which the second combined gas remains in the second reaction zone A, which is a region for heat retention, is lengthened to 600 milliseconds or longer, aggregation occurs between the particles, the specific surface area decreases, and the photocatalytic activity of the resulting powder product is decreased.

The method for calculating the time $t_2$ for which the second combined gas remains in the second reaction zone will be described. The calculation is carried out by the formulas: $t_2 = L_2/Ve_{second\ combined,\ T2}$, $Ve_{second\ combined,\ T2} = Vo_{second\ combined,\ T2}/S_{second\ reaction}$, $Vo_{second\ combined,\ T2} = Vo_{second\ combined,\ 0°\ C.} \times (273.15+T_2)/273.15$, $Vo_{second\ combined,\ 0°\ C.} = Vo_{first\ combined,\ 0°\ C.} + Vo_{second,\ 0°\ C.}$, and $Vo_{first\ combined,\ 0°\ C.} = Vo_{reaction,\ 0°\ C.} + Vo_{first,\ 0°\ C.}$.

Here, $L_2$ represents the length [m] of the second reaction zone in the direction of the reaction tube axis; $Ve_{second\ combined,\ T2}$ represents the linear viscosity [m/s] of the second combined gas calculated in terms of the temperature of the second combined gas; $Vo_{second\ combined,\ T2}$ represents the flow rate [m³/s] of the second combined gas calculated in terms of the temperature of the second combined gas; $S_{second\ reaction}$ represents the cross-sectional area [m²] of the second reaction zone; $Vo_{second\ combined,\ 0°\ C.}$ represents the flow rate of the second combined gas calculated in terms of 0° C.; $T_2$ represents the temperature of the second combined gas; $Vo_{first\ combined,\ 0°\ C.}$ represents the flow rate of the first combined gas calculated in terms of 0° C.; $Vo_{second,\ 0°\ C.}$ represents the flow rate of the second gas calculated in terms of 0° C.; $Vo_{reaction,\ 0°\ C.}$ represents the flow rate of the metal chloride-containing gas calculated in terms of 0° C.; and $Vo_{first,\ 0°\ C.}$ represents the flow rate of the first gas calculated in terms of 0° C.

In order to suppress aggregation between the particles in the downstream side of the insulating material 2, it is desirable to cool the gas inside the reaction tube effectively. Regarding the method, there are available methods such as natural heat dissipation from the wall surface of the reaction tube, blowing of cooling air from the outside of the reaction tube, and introduction of cooling air into the reaction tube.

[Concentration of Titanium Tetrachloride]

In the region 27 extending from the downstream end 4b of the first hollow inner cylinder 4 to the downstream end 4b of the second hollow inner cylinder 5, the concentration of titanium tetrachloride in the first combined gas formed as the metal chloride-containing gas and the first gas are combined at the first junction, is preferably adjusted to 0.1% to 15% by volume, more preferably to 0.1% to 5% by volume, and even more preferably to 0.2% to 2% by volume. When the concentration of titanium tetrachloride in the first combined gas is adjusted to the range described above, decahedral titanium oxide particles having a high photocatalytic activity are obtained.

Furthermore, as the concentration of titanium tetrachloride in the first combined gas that flows through the first reaction zone in the region 27 is lower, the primary particle size of the titanium oxide particles that constitute the powder product finally obtained decreases, and the specific surface area increases. When the concentration of titanium tetrachloride in the first combined gas that flows through the first reaction zone is adjusted to the range described above, a powder product having a high photocatalytic activity is obtained.

[Residence Time]

The time for which the first combined gas remains in the first reaction zone (hereinafter, referred to as "residence time") is preferably in the range of 30 to 400 milliseconds, more preferably in the range of 50 to 300 milliseconds, and even more preferably in the range of 100 to 200 milliseconds.

When the second junction is separately installed downstream of the first junction, the first reaction zone is provided, and there is available a time for which the first combined gas remains in the first reaction zone.

If the residence time is longer than 400 milliseconds, deposit films are likely to be produced on the wall surface inside the reaction tube in the first reaction zone, the yield of the powder product finally obtained is decreased, and the productivity of titanium oxide particles may be decreased.

On the contrary, if the residence time is shorter than 30 milliseconds, the rutile proportion of the titanium oxide particles finally obtained is high, the proportion of decahedral titanium oxide particles in the powder product is decreased, and the photocatalytic activity is decreased.

When the time for which the first combined gas remains in the first reaction zone is adjusted to the range of 30 to 400 milliseconds, the rutile proportion of the titanium oxide particles finally obtained is low, the proportion of decahedral titanium oxide particles in the powder product increases, and the photocatalytic activity is increased.

The method for calculating the time t1 for which the first combined gas remains in the first reaction zone will be described. The calculation is carried out by the formulas:

$t_1 = L_1/Ve_{first\ combined,\ T1}$, $Ve_{first\ combined,\ T1} = Vo_{first\ combined,\ T1}/S_{first\ reaction}$, $Vo_{first\ combined,\ T1} = Vo_{first\ combined,\ 0°\ C.} \times (273.15 + T_1)/273.15$, and $Vo_{first\ combined,\ 0°\ C.} = Vo_{reaction,\ 0°\ C.} + Vo_{first,\ 0°\ C.}$.

Here, $L_1$ represents the length [m] of the first reaction zone in the direction of the reaction tube axis; $Ve_{first\ combined,\ T1}$ represents the linear velocity [m/s] of the first combined gas calculated in terms of the temperature of the first combined gas; $Vo_{first\ combined,\ T1}$ represents the flow rate [m³/s] of the first combined gas calculated in terms of the temperature of the first combined gas; $S_{first\ reaction}$ represents the cross-sectional area [m²] of the first reaction zone; $Vo_{first\ combined,\ 0°\ C.}$ represents the flow rate of the first combined gas calculated in terms of 0° C.; $T_1$ represents the temperature of the first combined gas; $Vo_{reaction,\ 0°\ C.}$ represents the flow rate of the metal chloride-containing gas calculated in terms of 0° C., and $Vo_{first,\ 0°\ C.}$ represents the flow rate of the first gas calculated in terms of 0° C.

[Reynolds Number]

The Reynolds number of the second combined gas is preferably in the range of 10 to 10,000, more preferably in the range of 20 to 2000, and even more preferably in the range of 40 to 500.

When the Reynolds number is greater than 10,000, the turbulent state of the combined gas becomes more noticeable, and the effect of the oxidizing gas that suppresses diffusion of the titanium tetrachloride vapor from the vicinity of the central axis of the reaction tube 11 toward the inner wall surface side, is lost, so that the deposit amount of film-like products on the inner wall surface of the reaction tube 11 increases. When the Reynolds number of the second combined gas is less than 10, and in the case of having very low flow rate conditions with laminar flow, or in the case of having marked turbulent conditions with a Reynolds number of greater than 10,000, the proportion of decahedral particles in the powder product decreases, and the photocatalytic activity is also decreased. When the Reynolds number of the second combined gas is adjusted to the range of 10 to 10,000, the proportion of decahedral particles in the powder product is increased, and the photocatalytic activity is increased.

The Reynolds number Re is calculated by the formula: $Re = D \times u \times \rho/\mu$. Here, D represents the inner diameter (m) of the hollow outer cylinder 1; u represents the linear velocity (m/s); $\rho$ represents the density (kg/m³); and $\mu$ represents the viscosity [kg/(m×s)].

According to the present embodiment, a value of 33.4 (mm) is used as the value for D, the inner diameter of the hollow outer cylinder 1. Furthermore, as the value of u, the linear velocity (value calculated in terms of the temperature of the second combined gas) of the combined gas ($Cl_2+O_2$) after the reaction in the second reaction zone is used. As the value of $\rho$, the density (value calculated in terms of the temperature of the second combined gas) of the combined gas ($Cl_2+O_2$) after the reaction is used. As the value of $\mu$, the viscosity (value calculated in terms of the temperature of the second combined gas) of the combined gas after the reaction is used.

[Linear Velocity u of Combined Gas]

As the value of the linear velocity u of the combined gas ($Cl_2+O_2+N_2$) after the reaction in the second reaction zone, the linear velocity u (value calculated in terms of the temperature of the second combined gas) of the second combined gas ($TiCl_4+O_2+N_2$) can be used.

When $TiCl_4$ contained in the metal chloride-containing gas has been completely consumed by the reaction of the reaction formula (1) previously described, $Cl_2$ is produced in an amount (flow rate) of twice the amount of $TiCl_4$, and at the same time, $O_2$ is consumed in an amount equal to the amount of $TiCl_4$, so that the flow rate of $O_2$ is reduced. However, since $TiO_2$ thus produced is in the form of particles and is not a gas, eventually there is no change in the overall flow rate of the gases that flow through before and after this reaction.

[Density ρ of Combined Gas]

In order to calculate the value of the density ρ of the combined gas ($Cl_2+O_2+N_2$) after the reaction in the second reaction zone, the flow rate of the combined gas after the reaction (that is, flow rate of the second combined gas) flowing per unit time is used.

First, the flow rate obtained by calculating the flow rate of the combined gas after the reaction in the second reaction zone, in terms of the temperature of the second combined gas, is designated as $X_{second\ combined\ gas\ temperature}$ ($m^3/h$). The mass flow rate of the combined gas, $Y_{0°\ C.\ 1\ atm}$ (kg/h) is determined by using the flow rate equivalent to the flow rate of the combined gas after the reaction, $X_{second\ combined\ gas\ temperature}$ ($m^3/h$), in the normal state (0° C., 1 atm). At this time, the density of the combined gas after the reaction in the second reaction zone, $ρ=Y_{0°\ C.\ 1\ atm}$ (kg)/$X_{second\ combined\ gas\ temperature}$ ($m^3$).

In the calculation of the viscosity μ of the combined gas ($Cl_2+O_2+N_2$) after the reaction in the second reaction zone, the calculation formula: $μ=\exp\{a+b×\ln(t+273)\}$ is used. In the calculation formula, t represents the temperature (° C.), and is the temperature of the second combined gas as used herein. Furthermore, a and b are integers determined by the type of gases used, and the values are such that a=0.015 and b=0.864 for $Cl_2$; a=1.289 and b=0.711 for $O_2$; and a=1.388 and b=0.668 for $N_2$. These values of a and b are values obtained by solving simultaneous equations for a and b using a combination of t and μ, which are already known.

The viscosity μ of the combined gas ($Cl_2+O_2+N_2$) after the reaction is averaged by the formula shown below, and thus the viscosity μ (value calculated in terms of the temperature of the second combined gas) of the combined gas after the reaction is determined.

> Viscosity μ (value calculated in terms of the temperature of the second combined gas) of the combined gas after the reaction={(Flow rate of $Cl_2$ calculated in terms of the temperature of the second combined gas)×(Viscosity of $Cl_2$ calculated in terms of the temperature of the second combined gas)+(Flow rate of $O_2$ calculated in terms of the temperature of the second combined gas)×(Viscosity of $O_2$ calculated in terms of the temperature of the second combined gas)+(Flow rate of $N_2$ calculated in terms of the temperature of the second combined gas)×(Viscosity of $N_2$ calculated in terms of the temperature of the second combined gas)}/{Flow rate of the combined gas ($Cl_2+O_2+N_2$) after the reaction}

The invention has been described by taking titanium oxide particles as an example of the metal oxide particles, but the invention is not intended to be limited to this, and the metal oxide particles may also be, for example, silicon oxide particles or tin oxide particles. In the case of producing these metal oxide particles, metal chloride-containing gases respectively containing silicon tetrachloride vapor and tin tetrachloride vapor are used.

In the case of producing titanium oxide particles as the metal oxide particles, it is most preferable to use a mixed gas composed of titanium tetrachloride vapor and nitrogen as the metal chloride-containing gas, oxygen gas as the first gas, and oxygen gas as the second gas. When this combination is used, the thermal oxidation reaction of titanium tetrachloride in the first and second reaction zones is promoted, so that under the conditions in which the raw material gas flow rate is a high flow rate, the titanium tetrachloride vapor is completely consumed by the reaction.

Furthermore, the "proportion of decahedral titanium oxide particles in the powder product" can be increased, and thereby the photocatalytic activity of the resulting powder product is increased.

In addition, it is also acceptable to use a mixed gas composed of titanium tetrachloride vapor and oxygen as the metal chloride-containing gas, oxygen gas as the first gas, and oxygen gas as the second gas. In this case, the "proportion of decahedral titanium oxide particles in the powder product" can still be increased, and titanium oxide particles having a high photocatalytic activity can be obtained.

The method for producing metal oxide particles according to an embodiment of the invention has a constitution in which, when a preheated metal chloride-containing gas is combined with a preheated first gas that does not contain the metal chloride at a first junction 4b inside a reaction tube 11 to obtain a first combined gas, and the first combined gas is combined with a preheated second gas that does not contain the metal chloride at a second junction 5b which is further downstream of the first junction 4b to obtain a second combined gas, at least one of the metal chloride-containing gas and the first gas contains oxygen, and the preheated metal chloride-containing gas is further heated in a first reaction zone B which extends from the first junction 4b to the second junction 5b, by combining the metal chloride-containing gas with the first gas at the first junction 4b while setting the preheat temperature of the first gas at a temperature equal to or higher than the preheat temperature of the metal chloride-containing gas, as well as the first combined gas being further heated in a second reaction zone A which extends from the second junction 5b to the downstream, by combining the first combined gas with the second gas at the second junction 5b while setting the preheat temperature of the second gas at a temperature equal to or higher than the temperature of the first combined gas. Therefore, even if the raw material gas containing a metal chloride and an oxidizing gas is used at a high flow rate, metal oxide particles can be produced with high yield.

The method for producing metal oxide particles according to this embodiment of the invention has a constitution in which the metal chloride is titanium tetrachloride, and the metal oxide particles are titanium oxide particles. Therefore, even if the raw material gas containing a metal chloride and an oxidizing gas is used at a high flow rate, metal oxide particles having a high photocatalytic activity can be produced with high yield.

The method for producing metal oxide particles according to this embodiment of the invention has a constitution in which the titanium oxide particles are decahedral titanium oxide particles. Therefore, even if the raw material gas containing a metal chloride and an oxidizing gas is used at a high flow rate, decahedral titanium oxide particles having a high photocatalytic activity can be produced with high yield.

The method for producing metal oxide particles according to this embodiment of the invention has a constitution in which the preheat temperature of the metal chloride-containing gas is equal to or higher than 400° C. and equal to or lower than 800° C. Therefore, metal oxide particles having a high photocatalytic activity can be produced.

The method for producing metal oxide particles according to this embodiment of the invention has a constitution in which the temperature of the first combined gas is equal to or higher than 700° C. and equal to or lower than 850° C. Therefore, metal oxide particles having a high photocatalytic activity can be produced.

The method for producing metal oxide particles according to this embodiment of the invention has a constitution in which the temperature of the second combined gas is equal to or higher than 800° C. and equal to or lower than 1150° C. Therefore, even if the raw material gas containing a metal chloride and an oxidizing gas is used at a high flow rate, metal oxide particles having a high photocatalytic activity can be produced with high yield.

The method for producing metal oxide particles according to this embodiment of the invention has a constitution in which the preheat temperature of the first gas is equal to or higher than 700° C. and equal to or lower than 850° C. Therefore, metal oxide particles having a high photocatalytic activity can be produced.

The method for producing metal oxide particles according to this embodiment of the invention has a constitution in which the preheat temperature of the second gas is equal to or higher than 950° C. and equal to or lower than 1200° C. Therefore, even if the raw material gas containing a metal chloride and an oxidizing gas is used at a high flow rate, metal oxide particles having a high photocatalytic activity can be produced with high yield.

The method for producing metal oxide particles according to this embodiment of the invention has a constitution in which the metal chloride-containing gas contains nitrogen gas. Therefore, metal oxide particles having a high photocatalytic activity can be produced with high yield.

The method for producing metal oxide particles according to this embodiment of the invention has a constitution in which the first gas contains one or more gases selected from the group consisting of oxygen gas, nitrogen gas, argon and water vapor. Therefore, metal oxide particles having a high photocatalytic activity can be produced.

The method for producing metal oxide particles according to this embodiment of the invention has a constitution in which the second gas contains one or more gases selected from the group consisting of oxygen gas, nitrogen gas, argon and water vapor. Therefore, metal oxide particles having a high photocatalytic activity can be produced.

The method for producing metal oxide particles according to this embodiment of the invention has a constitution in which the concentration of titanium tetrachloride contained in the first combined gas is 0.1% to 15% by volume. Therefore, metal oxide particles having a high photocatalytic activity can be produced.

The method for producing metal oxide particles according to this embodiment of the invention has a constitution in which the time for which the first combined gas remains in the first reaction zone is 30 to 400 milliseconds. Therefore, metal oxide particles having a high photocatalytic activity can be produced.

The method for producing metal oxide particles according to this embodiment of the invention has a constitution in which the Reynolds number of the second combined gas is 10 to 10,000. Therefore, metal oxide particles having a high photocatalytic activity can be produced.

The apparatus for producing metal oxide particles according to an embodiment of the invention includes a reaction tube 11, and preheating units X, Y and Z that respectively preheat a metal chloride-containing gas, a first gas and a second gas, the reaction tube 11 including a hollow outer cylinder 1, a second hollow inner cylinder 5 that is inserted between a site in the upstream side 1a of the hollow outer cylinder 1 and a site in the middle of the hollow outer cylinder 1, and a first hollow inner cylinder 4 that is inserted between a site in the upstream side 5a of the second hollow inner cylinder 5 and a site in the middle of the second hollow inner cylinder 5, wherein the second hollow inner cylinder 5 has, in the upstream side 5a, a first conduit 15 for introducing the first gas that has been preheated, and the hollow outer cylinder 1 has, in the upstream side 1a, a second conduit 16 for introducing the second gas that has been preheated, and wherein the preheated metal chloride-containing gas is introduced from the upstream side 4a of the first hollow inner cylinder 4; the metal chloride-containing gas thus introduced is combined with the first gas that has been preheated, at the downstream end 4b of the first hollow inner cylinder 4; and the combined gas can be further combined with the second gas that has been preheated, at the downstream end 5b of the second hollow inner cylinder 5. Therefore, even if the raw material gas containing a metal chloride and an oxidizing gas is used at a high flow rate, metal oxide particles having a high photocatalytic activity can be produced with high yield.

EXAMPLES

Hereinafter, the invention will be specifically described based on Examples. However, the invention is not intended to be limited to these Examples, and appropriate modifications can be carried out so long as the gist is maintained.

Example 1

<Preparation of Apparatus>

First, the reaction tube 11 was produced using a quartz tube having an outer diameter of 38.0 mm, an inner diameter of 33.4 mm and a thickness of 2.3 mm as the hollow outer cylinder 1; a quartz tube having an outer diameter of 12.7 mm, an inner diameter of 10.0 mm and a thickness of 1.35 mm as the first hollow inner cylinder 4; and a quartz tube having an outer diameter of 25.0 mm, an inner diameter of 21.0 mm and a thickness of 2.0 mm as the second hollow inner cylinder 5, by arranging the hollow outer cylinder 1, the first hollow inner cylinder 4 and the second hollow inner cylinder 5 to be aligned along the same axis.

Next, an insulating material (ceramic fibers) 2 was wound around a part of the reaction tube 11 for a length of 12 cm, and thus the second reaction zone A was defined. In the downstream side of the insulating material 2, the temperature of the gas inside the reaction tube decreases by heat dissipation to the outside of the reaction tube. Therefore, the length of the second reaction zone A was defined by setting the length of the insulating material.

Subsequently, the second hollow inner cylinder 5 was disposed such that the downstream end 5b of the second hollow inner cylinder 5 came to the position of the upstream end of the second reaction zone A. A second gas which had been preheated by an electric heater in the preheating region Z, was arranged to be introduced to the upstream side 1a of the hollow outer cylinder 1, which was upstream of the downstream end 5b of the second hollow inner cylinder 5.

Subsequently, the first hollow inner cylinder 4 was disposed such that the downstream end 4b of the first hollow inner cylinder 4 came to a position upstream of the downstream end 5b of the second hollow inner cylinder.

A first gas which had been preheated by an electric heater in the preheating region Y, was arranged to be introduced to the upstream side 5a of the second hollow inner cylinder 5, which was upstream of the downstream end 4b of the first hollow inner cylinder 4.

A metal chloride-containing gas which had been preheated by an electric heater in the preheating region X, was arranged to be introduced to the upstream side 4a of the first hollow inner cylinder 4.

The length of the first reaction zone B was set at 6.1 cm. The length of the second reaction zone A was set at 10.8 cm.

Thus, the apparatus 101 for producing metal oxide particles shown in FIG. 1 was prepared as described above.

<Production Process>

Next, a first gas composed of oxygen ($O_2$) gas was passed through the preheating region Y, in which the temperature was maintained at 775° C. by an electric heater, to raise the temperature of the first gas to 775° C., and the first gas was introduced through the upstream side 5a of the second hollow inner cylinder 5. The flow rate of the first gas was set at 2000 Nml/min.

Subsequently, a second gas composed of oxygen ($O_2$) gas was passed through the preheating region Z, in which the temperature was maintained at 1100° C. by an electric heater, to raise the temperature of the second gas to 1100° C., and the second gas was introduced through the upstream side 1a of the hollow outer cylinder 1. The flow rate of the second gas was set at 3770 Nml/min.

Subsequently, a metal chloride-containing gas composed of titanium tetrachloride ($TiCl_4$) and nitrogen ($N_2$) gas was passed through the preheating region X, in which the temperature was maintained at 650° C. by an electric heater, to raise the temperature of the metal chloride-containing gas to 650° C., and the metal chloride-containing gas was introduced through the upstream side 4a of the first hollow inner cylinder 4. The flow rate of the metal chloride-containing gas was set at 230 Nml/min.

The total flow rate of the metal chloride-containing gas, first gas and second gas (raw material gas flow rate) was set at 6000 Nml/min.

The residence time for the first combined gas at the first reaction zone B was set at 150 milliseconds. The residence time for the second combined gas at the second reaction zone A was set at 208 milliseconds. Furthermore, the concentration of titanium tetrachloride in the first combined gas at the first reaction zone B was adjusted to 0.24% by volume. The temperature of the first combined gas was 762° C. The temperature of the second combined gas was 974° C. Furthermore, the Reynolds number of the second combined gas at the second reaction zone A was 95.

This Reynolds number was a value obtainable under an assumption that the second combined gas in the downstream side of the downstream end 5b of the second hollow inner cylinder 5 had reached 974° C. Furthermore, the residence time in the first reaction zone is a value obtainable under an assumption that the first combined gas in the downstream side of the downstream end 4b of the first hollow inner cylinder 4 has reached 762° C. The residence time in the second reaction zone is a value obtainable, under an assumption that the second combined gas in the downstream side of the downstream end 5b of the second hollow inner cylinder 5 has reached 974° C., by calculating the residence time that may be taken by the second combined gas to pass from the downstream end 5b of the second hollow inner cylinder 5 to the downstream end of the insulating material 2.

Finally, the metal oxide particles (Example 1) formed from a powder product were recovered at the product recovery unit 3.

<Evaluation of Characteristics>

An evaluation of the characteristics of the metal oxide particles (Example 1) was carried out as described below.

First, the yield of the powder product with respect to the raw materials was 95%. The powder product thus obtained was titanium oxide particles.

The term "yield of the powder product" is the mass ratio of the powder product produced, that is, titanium oxide particles, relative to the mass of the titanium oxide product obtainable in the case where the entire amount of the titanium tetrachloride used was converted to the titanium oxide product by the reaction of the reaction formula (1) previously described.

Subsequently, the titanium oxide particles were observed with a scanning electron microscope, and it was found thereby that the proportion of decahedral titanium oxide in the powder product was 70%.

The proportion of decahedral titanium oxide particles (hereinafter, referred to as "decahedral proportion") is a value obtained by counting the number of titanium oxide particles (powder product that has been arbitrarily sampled) at five or more visual fields under an observation with a scanning electron microscope, and calculating the proportion of decahedral titanium oxide particles relative to the titanium oxide particles.

Figure 3A:
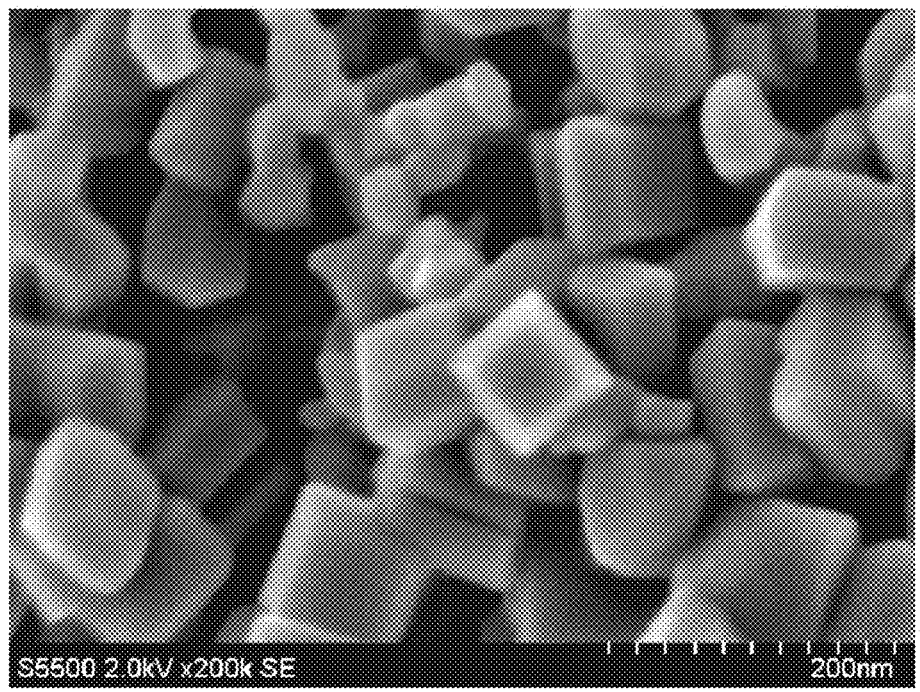
FIG. 3A is a set of scanning electron micrographs of the metal oxide particles (titanium oxide particles) of Example 1 at a magnification of 200,000 times.
Figure 3B:
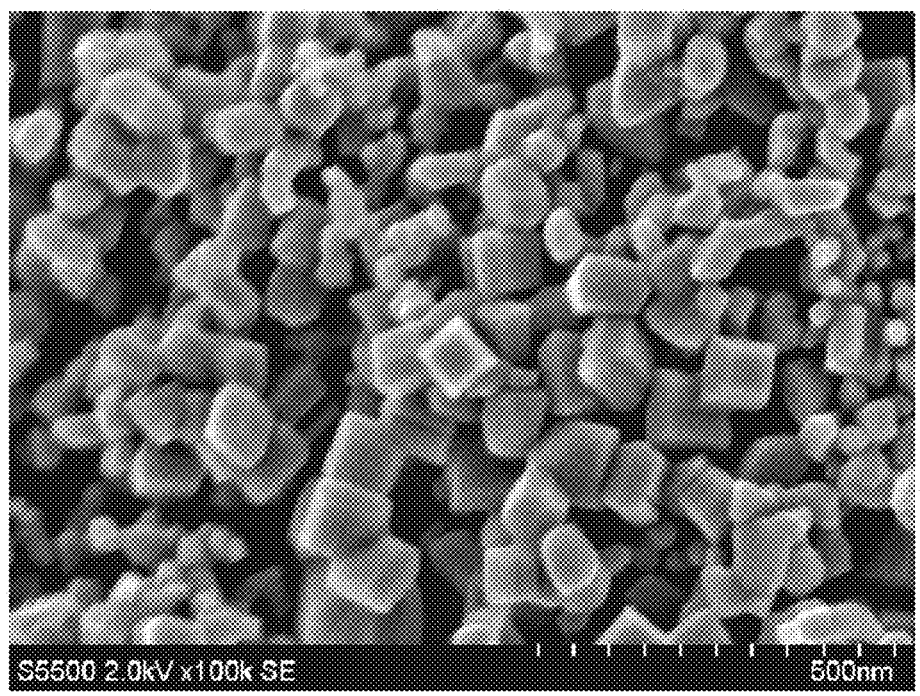
FIG. 3B is a set of scanning electron micrographs of the metal oxide particles (titanium oxide particles) of Example 1 at a magnification of 100,000 times.

FIGS. 3A and 3B shows scanning electron micrographs of the metal oxide particles (titanium oxide particles) of Example 1, and FIG. 3A is a photograph at a magnification of 200,000 times, and FIG. 3B is a photograph at a magnification of 100,000 times.

Furthermore, it was found that the specific surface area (BET) of the particles obtained was 25 $m^2/g$.

Next, it was found by an X-ray diffraction analysis that the proportion of rutile was 5%.

This proportion of rutile is a result obtained by estimating the proportion (%) of titanium oxide particles having a rutile-type crystal structure, from the peak intensity obtained by an X-ray diffraction analysis.

Subsequently, the photocatalytic activity of the titanium oxide produced was evaluated using a gas chromatographic method.

First, 10 mg of a titanium oxide powder was placed in a petri dish having an inner diameter of 27 mm, water was added thereto to disperse the titanium oxide powder, and the dispersion was dried at 110° C.

Subsequently, this petri dish was placed in a 500-ml chamber, and the chamber was purged with synthetic air. Subsequently, acetaldehyde in an amount equivalent to 500 ppm and 5.8 µl of water (amount equivalent to a relative humidity of 50% at 25° C.) were added to the petri dish, and the content of the petri dish was irradiated with light from a xenon light source at an intensity of 0.2 mW/$cm^2$. Then, the amount of carbon dioxide ($CO_2$) generated in one hour was quantified by gas chromatography. As a result, the generation amount of carbon dioxide ($CO_2$) in terms of photocatalytic activity was 121 ppm/h.

Example 2

Metal oxide particles of Example 2 were produced in the same manner as in Example 1, except that the preheat temperature of the first gas was set at 350° C., the temperature of the first combined gas was set at 731° C., the temperature of the second combined gas was set at 963° C., the length of the first reaction zone B was set at 5.9 cm, and the length of the second reaction zone A was set at 10.7 cm.

The yield of the powder product relative to the raw materials was 93%. Furthermore, it was found that the proportion of decahedral titanium oxide in the powder product was 50%. The photocatalytic activity was 101 ppm/h. The specific surface area of the particles obtained was 26 m²/g. In addition, the proportion of rutile was 7%.

Example 3

Metal oxide particles of Example 3 were produced in the same manner as in Example 1, except that the preheat temperature of the metal chloride-containing gas was set at 550° C., the temperature of the first combined gas was set at 752° C., the temperature of the second combined gas was set at 970° C., the length of the first reaction zone B was set at 6.1 cm, and the length of the second reaction zone A was set at 10.8 cm.

The yield of the powder product relative to the raw materials was 94%. Furthermore, it was found that the proportion of decahedral titanium oxide in the powder product was 60%. The photocatalytic activity was 112 ppm/h. The specific surface area of the particles obtained was 25 m²/g. In addition, the proportion of rutile was 6%.

Example 4

Metal oxide particles of Example 4 were produced in the same manner as in Example 1, except that the preheat temperature of the first gas was set at 725° C., the temperature of the first combined gas was set at 717° C., the temperature of the second combined gas was set at 958° C., the length of the first reaction zone B was set at 5.8 cm, the length of the second reaction zone A was set at 10.7 cm, and the Reynolds number of the second combined gas in the second reaction zone A was adjusted to 96. This Reynolds number was a value obtainable under an assumption that the second combined gas in the downstream side of the downstream end 5b of the second hollow inner cylinder 5 had reached 958° C.

The yield of the powder product relative to the raw materials was 95%. Furthermore, it was found that the proportion of decahedral titanium oxide in the powder product was 60%. The photocatalytic activity was 115 ppm/h. The specific surface area of the particles obtained was 25 m²/g. In addition, the proportion of rutile was 6%.

Example 5

Metal oxide particles of Example 5 were produced in the same manner as in Example 1, except that the preheat temperature of the first gas was set at 900° C., the temperature of the first combined gas was set at 874° C., the temperature of the second combined gas was set at 1016° C., the length of the first reaction zone B was set at 6.7 cm, the length of the second reaction zone A was set at 11.2 cm, and the Reynolds number of the second combined gas in the second reaction zone A was adjusted to 92. This Reynolds number was a value obtainable under an assumption that the second combined gas in the downstream side of the downstream end 5b of the second hollow inner cylinder 5 had reached 1016° C.

The yield of the powder product relative to the raw materials was 96%. Furthermore, it was found that the proportion of decahedral titanium oxide in the powder product was 20%. The photocatalytic activity was 82 ppm/h. The specific surface area of the particles obtained was 22 m²/g. In addition, the proportion of rutile was 12%.

Example 6

Metal oxide particles of Example 6 were produced in the same manner as in Example 1, except that the preheat temperature of the second gas was set at 1000° C., the temperature of the second combined gas was set at 911° C., the length of the first reaction zone B was set at 6.1 cm, the length of the second reaction zone A was set at 10.3 cm, and the Reynolds number of the second combined gas in the second reaction zone A was adjusted to 99. This Reynolds number was a value obtainable under an assumption that the second combined gas in the downstream side of the downstream end 5b of the second hollow inner cylinder 5 had reached 911° C.

The yield of the powder product relative to the raw materials was 96%. Furthermore, it was found that the proportion of decahedral titanium oxide in the powder product was 70%. The photocatalytic activity was 120 ppm/h. The specific surface area of the particles obtained was 25 m²/g. In addition, the proportion of rutile was 5%.

Example 7

Metal oxide particles of Example 7 were produced in the same manner as in Example 1, except that the preheat temperature of the second gas was set at 950° C., the temperature of the second combined gas was set at 880° C., the length of the first reaction zone B was set at 6.1 cm, the length of the second reaction zone A was set at 10.0 cm, and the Reynolds number of the second combined gas in the second reaction zone A was adjusted to 101. This Reynolds number was a value obtainable under an assumption that the second combined gas in the downstream side of the downstream end 5b of the second hollow inner cylinder 5 had reached 880° C.

The yield of the powder product relative to the raw materials was 60%. Furthermore, it was found that the proportion of decahedral titanium oxide in the powder product was 60%. The photocatalytic activity was 114 ppm/h. The specific surface area of the particles obtained was 29 m²/g. In addition, the proportion of rutile was 6%.

Example 8

Metal oxide particles of Example 8 were produced in the same manner as in Example 1, except that the concentration of titanium tetrachloride in the first combined gas was adjusted to 0.08%, the temperature of the second combined gas was set at 975° C., and the Reynolds number of the second combined gas in the second reaction zone A was adjusted to 94. This Reynolds number was a value obtainable under an assumption that the second combined gas in the downstream side of the downstream end 5b of the second hollow inner cylinder 5 had reached 975° C.

The yield of the powder product relative to the raw materials was 95%. Furthermore, it was found that the proportion of decahedral titanium oxide in the powder product was 60%. The photocatalytic activity was 105 ppm/h. The specific surface area of the particles obtained was 28 m²/g. In addition, the proportion of rutile was 7%.

Example 9

Metal oxide particles of Example 9 were produced in the same manner as in Example 1, except that the concentration of titanium tetrachloride in the first combined gas was adjusted to 0.52%, and the temperature of the first combined gas was set at 761° C.

The yield of the powder product relative to the raw materials was 95%. Furthermore, it was found that the proportion of decahedral titanium oxide in the powder product was 70%. The photocatalytic activity was 118 ppm/h. The specific surface area of the particles obtained was 23 m²/g. In addition, the proportion of rutile was 5%.

Example 10

Metal oxide particles of Example 10 were produced in the same manner as in Example 1, except that the concentration of titanium tetrachloride in the first combined gas was adjusted to 1.48%, the temperature of the first combined gas was set at 759° C., the temperature of the second combined gas was set at 971° C., and the Reynolds number of the second combined gas in the second reaction zone A was adjusted to 97. This Reynolds number was a value obtainable under an assumption that the second combined gas in the downstream side of the downstream end 5b of the second hollow inner cylinder 5 had reached 971° C.

The yield of the powder product relative to the raw materials was 94%. Furthermore, it was found that the proportion of decahedral titanium oxide in the powder product was 70%. The photocatalytic activity was 115 ppm/h. The specific surface area of the particles obtained was 20 m²/g. In addition, the proportion of rutile was 6%.

Example 11

Metal oxide particles of Example 11 were produced in the same manner as in Example 1, except that the concentration of titanium tetrachloride in the first combined gas was adjusted to 3.0%, the temperature of the first combined gas was set at 755° C., the temperature of the second combined gas was set at 967° C., and the Reynolds number of the second combined gas in the second reaction zone A was adjusted to 99. This Reynolds number was a value obtainable under an assumption that the second combined gas in the downstream side of the downstream end 5b of the second hollow inner cylinder 5 had reached 967° C.

The yield of the powder product relative to the raw materials was 94%. Furthermore, it was found that the proportion of decahedral titanium oxide in the powder product was 70%. The photocatalytic activity was 112 ppm/h. The specific surface area of the particles obtained was 17 m²/g. In addition, the proportion of rutile was 6%.

Example 12

Metal oxide particles of Example 12 were produced in the same manner as in Example 1, except that the concentration of titanium tetrachloride in the first combined gas was adjusted to 8.0%, the temperature of the first combined gas was set at 745° C., the temperature of the second combined gas was set at 954° C., and the Reynolds number of the second combined gas in the second reaction zone A was adjusted to 107. This Reynolds number was a value obtainable under an assumption that the second combined gas in the side downstream of the downstream end 5b of the second hollow inner cylinder 5 had reached 954° C.

The yield of the powder product relative to the raw materials was 94%. Furthermore, it was found that the proportion of decahedral titanium oxide in the powder product was 70%. The photocatalytic activity was 108 ppm/h. The specific surface area of the particles obtained was 13 m²/g. In addition, the proportion of rutile was 6%.

Example 13

Metal oxide particles of Example 13 were produced in the same manner as in Example 1, except that the length of the first reaction zone B was set at 0.6 cm, and the residence time for the first combined gas in the first reaction zone B was adjusted to 15 milliseconds.

Here, the residence time for the first combined gas in the first reaction zone B was calculated under an assumption that the temperature of the first combined gas has reached 762° C.

The yield of the powder product relative to the raw materials was 98%. Furthermore, it was found that the proportion of decahedral titanium oxide in the powder product was 10%. The photocatalytic activity was 75 ppm/h. The specific surface area of the particles obtained was 26 m²/g. In addition, the proportion of rutile was 24%.

Example 14

Metal oxide particles of Example 14 were produced in the same manner as in Example 1, except that the length of the first reaction zone B was set at 10.2 cm, and the residence time for the first combined gas in the first reaction zone B was adjusted to 250 milliseconds.

Here, the residence time for the first combined gas in the first reaction zone B was calculated under an assumption that the temperature of the first combined gas has reached 762° C.

The yield of the powder product relative to the raw materials was 90%. Furthermore, it was found that the proportion of decahedral titanium oxide in the powder product was 70%. The photocatalytic activity was 120 ppm/h. The specific surface area of the particles obtained was 25 m²/g. In addition, the proportion of rutile was 4%.

Example 15

Metal oxide particles of Example 15 were produced in the same manner as in Example 1, except that the length of the first reaction zone B was set at 15.5 cm, and the residence time for the first combined gas in the first reaction zone B was adjusted to 380 milliseconds.

Here, the residence time for the first combined gas in the first reaction zone B was calculated under an assumption that the temperature of the first combined gas has reached 762° C.

The yield of the powder product relative to the raw materials was 85%. Furthermore, it was found that the proportion of decahedral titanium oxide in the powder product was 80%. The photocatalytic activity was 125 ppm/h. The specific surface area of the particles obtained was 23 m²/g. In addition, the proportion of rutile was 3%.

Example 16

Metal oxide particles of Example 16 were produced in the same manner as in Example 1, except that the length of the first reaction zone B was set at 30.5 cm, and the residence time for the first combined gas in the first reaction zone B was adjusted to 750 milliseconds.

Here, the residence time for the first combined gas in the first reaction zone B was calculated under an assumption that the temperature of the first combined gas has reached 762° C.

The yield of the powder product relative to the raw materials was 49%. Furthermore, it was found that the proportion of decahedral titanium oxide in the powder product was 80%. The photocatalytic activity was 130 ppm/h. The specific surface area of the particles obtained was 22 m²/g. In addition, the proportion of rutile was 2%.

Reference Example 1

Metal oxide particles of Reference Example 1 were produced in the same manner as in Example 1, except that the preheat temperature of the metal chloride-containing gas was set at 900° C., the preheat temperature of the first gas was set at 900° C., the temperature of the first combined gas was set at 900° C., the temperature of the second combined gas was set at 1026° C., the length of the first reaction zone B was set at 6.9 cm, the length of the second reaction zone A was set at 11.3 cm, and the Reynolds number of the second combined gas in the second reaction zone A was adjusted to 92. This Reynolds number was a value obtainable under an assumption that the second combined gas in the downstream side of the downstream end 5b of the second hollow inner cylinder 5 had reached 1026° C.

The yield of the powder product relative to the raw materials was 97%. Furthermore, it was found that the proportion of decahedral titanium oxide in the powder product was 10%. The photocatalytic activity was 70 ppm/h. The specific surface area of the particles obtained was 21 $m^2/g$. In addition, the proportion of rutile was 15%.

Reference Example 2

Metal oxide particles of Reference Example 2 were produced in the same manner as in Example 1, except that the preheat temperature of the first gas was set at 650° C., the temperature of the first combined gas was set at 650° C., the temperature of the second combined gas was set at 933° C., the length of the first reaction zone B was set at 5.4 cm, the length of the second reaction zone A was set at 10.5 cm, and the Reynolds number of the second combined gas in the second reaction zone A was adjusted to 96. This Reynolds number was a value obtainable under an assumption that the second combined gas in the downstream side of the downstream end 5b of the second hollow inner cylinder 5 had reached 933° C.

The yield of the powder product relative to the raw materials was 93%. Furthermore, it was found that the proportion of decahedral titanium oxide in the powder product was 10%. The photocatalytic activity was 80 ppm/h. The specific surface area of the particles obtained was 27 $m^2/g$. In addition, the proportion of rutile was 30%.

Comparative Example 1

Figure 2:
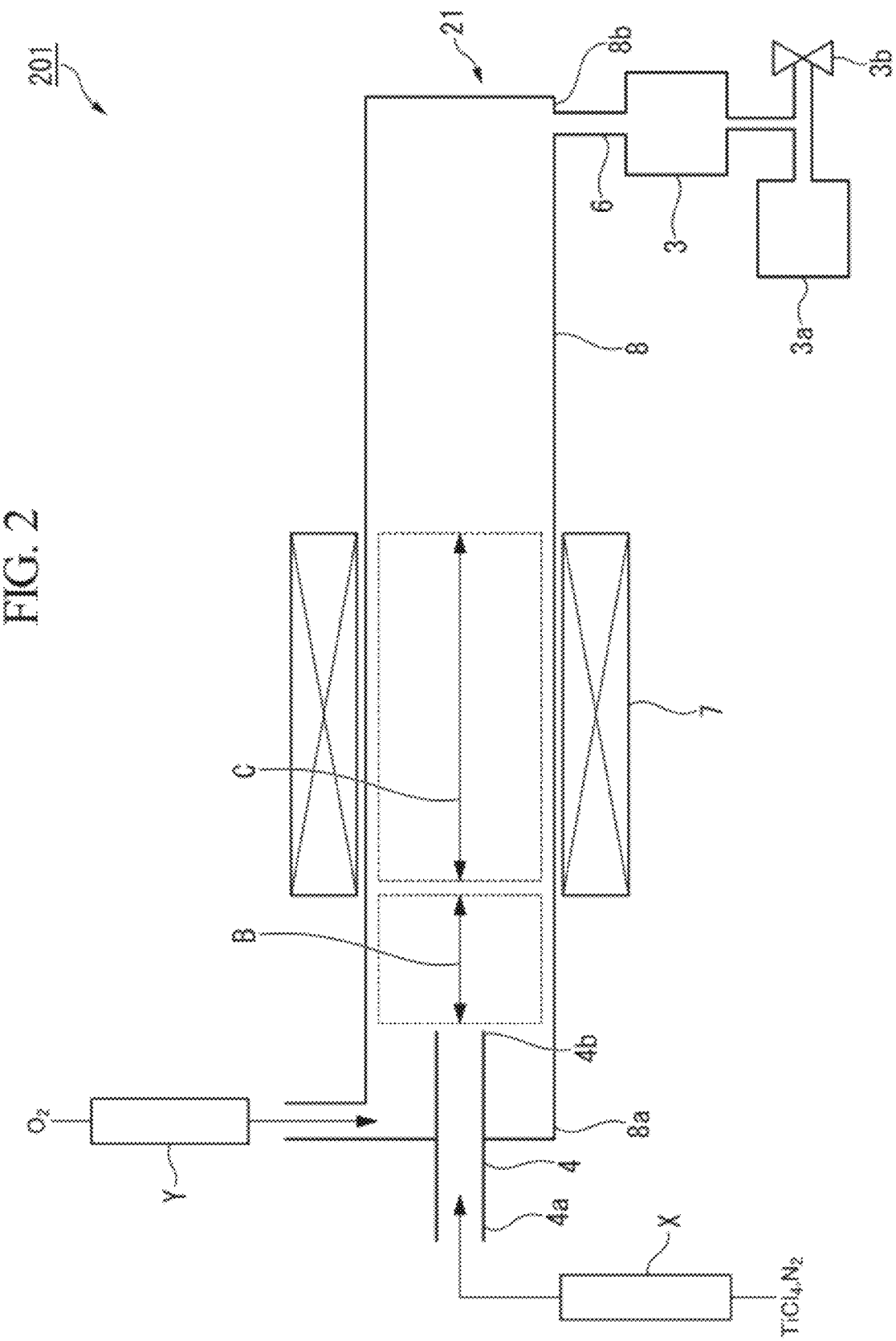
FIG. 2 is a schematic diagram showing a comparative example of the apparatus for producing metal oxide particles.

FIG. 2 is a schematic diagram showing a Comparative Example of the apparatus for producing metal oxide particles.

The production apparatus 201 of the Comparative Example has the same constitution as that of the production apparatus 101, except that the second hollow inner cylinder and the second junction are not provided, the second gas is not introduced into the reaction tube 21, and an insulating material is not wound around a part of the reaction tube 21, but instead, a region heated by an electric heater 7 from the outside of the reaction tube (externally heated region C) is provided in a part of the reaction tube 21. Here, the same reference numerals are used to indicate the same member regions. The first combined gas passes through the externally heated region C.

The temperature of the reaction tube outer wall surface of the externally heated zone was set at 1100° C. The reaction tube 21 was produced using a quartz tube having an outer diameter of 38.0 mm, an inner diameter of 33.4 mm and a thickness of 2.3 mm as the hollow outer cylinder 8, and a quartz tube having an outer diameter of 12.7 mm, an inner diameter of 10.0 mm and a thickness of 1.35 mm as the first hollow inner cylinder 4, by arranging the hollow outer cylinder 8 and the first hollow inner cylinder 4 to be aligned along the same axis. The first hollow inner cylinder 4 is arranged to be inserted between a site in the upstream side of the hollow outer cylinder 8 and a site in the middle of the hollow outer cylinder 8.

A first gas composed of oxygen ($O_2$) gas was passed through the preheating region Y, in which the temperature was maintained at 775° C. by an electric heater, to raise the temperature of the first gas to 775° C., and the first gas was introduced through the upstream side 8a of the hollow outer cylinder 8. The flow rate of the first gas was set at 5489 Nml/min.

Subsequently, a metal chloride-containing gas composed of titanium tetrachloride ($TiCl_4$) and nitrogen ($N_2$) gas was passed through the preheating region X, in which the temperature was maintained at 650° C. by an electric heater, to raise the temperature of the second gas to 650° C., and the metal chloride-containing gas was introduced through the upstream side 4a of the first hollow inner cylinder 1. The flow rate of the metal chloride-containing gas was set at 511 Nml/min. The total flow rate of the metal chloride-containing gas and the first gas (raw material gas flow rate) was set at 6000 Nml/min. The concentration of titanium tetrachloride in the first combined gas in the first reaction zone B was adjusted to 0.24% by volume.

The temperature of the first combined gas was set at 764° C., the length of the first reaction zone B was set at 6.5 cm, and the time for which the first combined gas stayed in the first reaction zone B was adjusted to 150 milliseconds. Here, the residence time for the first combined gas in the first reaction zone B was calculated under an assumption that the temperature of the first combined gas had reached 764° C. Furthermore, the Reynolds number in the externally heated region C was adjusted to 89. This Reynolds number was a value obtainable under an assumption that the first combined gas in the externally heated region C had reached 1100° C.

The length of the externally heated region C was set at 12 cm, and the time for which the first combined gas stayed in the externally heated region C was adjusted to 208 milliseconds. Here, the residence time for the first combined gas in the externally heated region C was calculated under an assumption that the first combined gas in the externally heated region C has reached 1100° C.

Metal oxide particles of Comparative Example 1 were produced in the same manner as in Example 1, using the production apparatus 201. The yield of the powder product with respective to the raw materials was 43%, and it was found that the proportion of decahedral titanium oxide in the powder product was 70%. The photocatalytic activity was 124 ppm/h. The BET specific surface area was 26 $m^2/g$. The proportion of rutile was 0%.

Comparative Example 2

Commercially available titanium oxide particles for use as a photocatalyst were purchased for a comparison of characteristics. These titanium oxide particles (Comparative Example 2) were particles synthesized by a flame method. When the titanium oxide particles were observed with an electron microscope, the particle shape was amorphous, and the primary particle size was 20 to 60 nm. Furthermore, it was found from the results of an X-ray diffraction analysis that the particles were a mixture of anatase and rutile.

The proportion of decahedral titanium oxide of the titanium oxide particles (Comparative Example 2) was 0%, and the photocatalytic activity was 70 ppm/h. The specific surface area of the particles was 50 $m^2/g$.

The production conditions for Examples 1 to 16, Reference Examples 1 and 2, and Comparative Example 1 are summarized in Table 1 and Table 2.

TABLE 1

| | Production apparatus | First hollow inner cylinder Inner diameter (mm) | Concentration of titanium tetrachloride in first combined gas (vol %) | Residence time for first combined gas in first reaction zone B (milliseconds) | Residence time for second combined gas in second reaction zone A (milliseconds) | Temperature conditions (° C.) Preheat temperature Metal chloride-containing gas | First gas | Second gas | Temperature of first combined gas | Temperature of second combined gas |
|---|---|---|---|---|---|---|---|---|---|---|
| Example 1 | FIG. 1 | 10 | 0.24% | 150 | 208 | 650 | 775 | 1100 | 762 | 974 |
| Example 2 | FIG. 1 | 10 | 0.24% | 150 | 208 | 350 | 775 | 1100 | 731 | 963 |
| Example 3 | FIG. 1 | 10 | 0.24% | 150 | 208 | 550 | 775 | 1100 | 752 | 970 |
| Example 4 | FIG. 1 | 10 | 0.24% | 150 | 208 | 650 | 725 | 1100 | 717 | 958 |
| Example 5 | FIG. 1 | 10 | 0.24% | 150 | 208 | 650 | 900 | 1100 | 874 | 1016 |
| Example 6 | FIG. 1 | 10 | 0.24% | 150 | 208 | 650 | 775 | 1000 | 762 | 911 |
| Example 7 | FIG. 1 | 10 | 0.24% | 150 | 208 | 650 | 775 | 950 | 762 | 880 |
| Example 8 | FIG. 1 | 10 | 0.08% | 150 | 208 | 650 | 775 | 1100 | 762 | 975 |
| Example 9 | FIG. 1 | 10 | 0.52% | 150 | 208 | 650 | 775 | 1100 | 761 | 974 |
| Example 10 | FIG. 1 | 10 | 1.48% | 150 | 208 | 650 | 775 | 1100 | 759 | 971 |

| | Temperature of external heating | Metal chloride-containing gas Type | Flow rate (Nml/min) | First gas Type | Flow rate (Nml/min) | Second gas Type | Flow rate (Nml/min) | Total flow rate of raw material gases Flow rate (Nml/min) | Reynolds number |
|---|---|---|---|---|---|---|---|---|---|
| Example 1 | — | Titanium tetrachloride, nitrogen | 230 | Oxygen | 2000 | Oxygen | 3770 | 6000 | 95 |
| Example 2 | — | Titanium tetrachloride, nitrogen | 230 | Oxygen | 2000 | Oxygen | 3770 | 6000 | 95 |
| Example 3 | — | Titanium tetrachloride, nitrogen | 230 | Oxygen | 2000 | Oxygen | 3770 | 6000 | 95 |
| Example 4 | — | Titanium tetrachloride, nitrogen | 230 | Oxygen | 2000 | Oxygen | 3770 | 6000 | 96 |
| Example 5 | — | Titanium tetrachloride, nitrogen | 230 | Oxygen | 2000 | Oxygen | 3770 | 6000 | 92 |
| Example 6 | — | Titanium tetrachloride, nitrogen | 230 | Oxygen | 2000 | Oxygen | 3770 | 6000 | 99 |
| Example 7 | — | Titanium tetrachloride, nitrogen | 230 | Oxygen | 2000 | Oxygen | 3770 | 6000 | 101 |
| Example 8 | — | Titanium tetrachloride, nitrogen | 230 | Oxygen | 2000 | Oxygen | 3770 | 6000 | 94 |
| Example 9 | — | Titanium tetrachloride, nitrogen | 230 | Oxygen | 2000 | Oxygen | 3770 | 6000 | 95 |
| Example 10 | — | Titanium tetrachloride, nitrogen | 230 | Oxygen | 2000 | Oxygen | 3770 | 6000 | 97 |

TABLE 2

| | Production apparatus | First hollow inner cylinder Inner diameter (mm) | Concentration of titanium tetrachloride in first combined gas (vol %) | Residence time for first combined gas in first reaction zone B (milliseconds) | Residence time for second combined gas in second reaction zone A (milliseconds) | Temperature conditions (° C.) Preheat temperature Metal chloride-containing gas | First gas | Second gas | Temperature of first combined gas | Temperature of second combined gas |
|---|---|---|---|---|---|---|---|---|---|---|
| Example 11 | FIG. 1 | 10 | 3.0% | 150 | 208 | 650 | 775 | 1100 | 755 | 967 |
| Example 12 | FIG. 1 | 10 | 8.0% | 150 | 208 | 650 | 775 | 1100 | 745 | 954 |
| Example 13 | FIG. 1 | 10 | 0.24% | 15 | 208 | 650 | 775 | 1100 | 762 | 974 |
| Example 14 | FIG. 1 | 10 | 0.24% | 250 | 208 | 650 | 775 | 1100 | 762 | 974 |
| Example 15 | FIG. 1 | 10 | 0.24% | 380 | 208 | 650 | 775 | 1100 | 762 | 974 |
| Example 16 | FIG. 1 | 10 | 0.24% | 750 | 208 | 650 | 775 | 1000 | 762 | 974 |
| Reference Example 1 | FIG. 1 | 10 | 0.24% | 150 | 208 | 650 | 900 | 1100 | 900 | 1026 |
| Reference Example 2 | FIG. 1 | 10 | 0.24% | 150 | 208 | 650 | 650 | 1100 | 650 | 933 |
| Comparative Example 1 | FIG. 2 | 10 | 0.24% | 150 | 208 (Remarks) | 650 | 775 | — | 764 | — |

| | Temperature of external heating | Metal chloride-containing gas Type | Flow rate (Nml/min) | First gas Type | Flow rate (Nml/min) | Second gas Type | Flow rate (Nml/min) | Total flow rate of raw material gases Flow rate (Nml/min) | Reynolds number |
|---|---|---|---|---|---|---|---|---|---|
| Example 11 | — | Titanium tetrachloride, nitrogen | 230 | Oxygen | 2000 | Oxygen | 3770 | 6000 | 99 |
| Example 12 | — | Titanium tetrachloride, nitrogen | 230 | Oxygen | 2000 | Oxygen | 3770 | 6000 | 107 |
| Example 13 | — | Titanium tetrachloride, nitrogen | 230 | Oxygen | 2000 | Oxygen | 3770 | 6000 | 95 |
| Example 14 | — | Titanium tetrachloride, nitrogen | 230 | Oxygen | 2000 | Oxygen | 3770 | 6000 | 95 |
| Example 15 | — | Titanium tetrachloride, nitrogen | 230 | Oxygen | 2000 | Oxygen | 3770 | 6000 | 95 |
| Example 16 | — | Titanium tetrachloride, nitrogen | 230 | Oxygen | 2000 | Oxygen | 3770 | 6000 | 95 |
| Reference Example 1 | — | Titanium tetrachloride, nitrogen | 230 | Oxygen | 2000 | Oxygen | 3770 | 6000 | 92 |
| Reference Example 2 | — | Titanium tetrachloride, nitrogen | 230 | Oxygen | 2000 | Oxygen | 3770 | 6000 | 96 |
| Comparative Example 1 | 1100 | Titanium tetrachloride, nitrogen | 511 | Oxygen | 5489 | — | — | 6000 | 89 |

Remarks: Time for which the first combined gas stayed in the externally heated region C (milliseconds)

Furthermore, the yields of the powder products, the decahedral proportion in the powder products, the photocatalytic activity, the specific surface areas (BET measurement value, m²/g), and the proportion of rutile of Examples 1 to 16, Reference Examples 1 and 2, and Comparative Examples 1 and 2 are summarized in Table 3.

In order to obtain a higher photocatalytic activity than Examples 1 to 3 and 5, the preheat temperature of the metal chloride-containing gas is preferably set at a temperature in the range of equal to or higher than 400° C. and equal to or lower than 800° C., more preferably in the range of equal to or higher than 500° C. and equal to or lower than 750° C., and

TABLE 3

| | Presence of un-reacted titanium tetrachloride in downstream of second reaction zone A | Yield of powder product (%) | Decahedral proportion (%) | Photocatalytic activity Rate of $CO_2$ production (ppm/h) | BET ($m^2$/g) | Proportion of rutile |
|---|---|---|---|---|---|---|
| Example 1 | Absent | 95 | 70 | 121 | 25 | 5% |
| Example 2 | Absent | 93 | 50 | 101 | 26 | 7% |
| Example 3 | Absent | 94 | 60 | 112 | 25 | 6% |
| Example 4 | Absent | 95 | 60 | 115 | 25 | 6% |
| Example 5 | Absent | 96 | 20 | 82 | 22 | 12% |
| Example 6 | Absent | 96 | 70 | 120 | 25 | 5% |
| Example 7 | Present | 60 | 60 | 114 | 29 | 6% |
| Example 8 | Absent | 95 | 60 | 105 | 28 | 7% |
| Example 9 | Absent | 95 | 70 | 118 | 23 | 5% |
| Example 10 | Absent | 94 | 70 | 115 | 20 | 6% |
| Example 11 | Absent | 94 | 70 | 112 | 17 | 6% |
| Example 12 | Absent | 94 | 70 | 108 | 13 | 6% |
| Example 13 | Absent | 98 | 10 | 75 | 26 | 24% |
| Example 14 | Absent | 90 | 70 | 120 | 25 | 4% |
| Example 15 | Absent | 85 | 80 | 125 | 23 | 3% |
| Example 16 | Absent | 49 | 80 | 130 | 22 | 2% |
| Reference Example 1 | Absent | 97 | 10 | 70 | 21 | 15% |
| Reference Example 2 | Absent | 93 | 10 | 80 | 27 | 30% |
| Comparative Example 1 | Present | 43 | 70 | 124 | 26 | 0% |
| Comparative Example 2 | — | — | 0 | 70 | 50 | — |

In Comparative Example 1 which adopted a system of heating from the outside of the reaction tube, the reaction was not completed in the externally heated region C, and unreacted titanium tetrachloride remained in the downstream side of the externally heated region C. As a result, the powder yield was a low yield such as 43%.

On the contrary, in Examples 1 to 6 and 8 to 14 according to the invention which adopted a system of heating through combination with preheated first gas and preheated second gas, the reaction was completed in the second reaction zone, unreacted titanium tetrachloride did not remain in the downstream side of the second reaction zone, and powder products were obtained with a powder yield of 90% or higher. Particularly, Example 1 had a photocatalytic activity that was equivalent to that of Comparative Example 1, and had the powder yield greatly improved to 95%. In both Example 1 and Comparative Example 1, deposit films of side products were hardly formed on the inner wall surface of the first reaction zone. In Example 1, no deposit films of side products were formed even at the second reaction zone.

In regard to Examples 1 to 3 and 5, a comparison was made on the characteristics of the titanium oxide particles obtainable by changing the preheat temperature of the metal chloride-containing gas.

Relative to 650° C. of Example 1, as the preheat temperature was decreased to 550° C. (Example 3) and 350° C. (Example 2), the proportion of rutile slightly increased from 5% to 7%, and the photocatalytic activity slightly decreased. Relative to 650° C. of Example 1, as the preheat temperature was increased 900° C. (Reference Example 1), the proportion of rutile slightly increased from 12% to 15%, and the photocatalytic activity slightly decreased.

even more preferably equal to or higher than 600° C. and lower than 700° C.

In regard to Examples 1, 4 and 5, a comparison was made on the characteristics of the titanium oxide particles obtainable by changing the preheat temperature of the first gas.

In Example 5 where the preheat temperature of the first gas was set at 900° C., the proportion of rutile increased to a large extent as compared with Example 1 where the preheat temperature was set at 775° C., and the photocatalytic activity decreased to a large extent.

In Reference Example 2 where the preheat temperature of the first gas was set at 650° C., the proportion of rutile increased to a large extent as compared with Example 1 where the preheat temperature was set at 775° C., and the photocatalytic activity decreased to a large extent.

In Example 4 where the preheat temperature of the first gas was set at 725° C., the proportion of rutile slightly increased as compared with Example 1 where the preheat temperature was set at 775° C., and the photocatalytic activity slightly decreased.

As can be seen from Examples 1, 4 and 5, in order to obtain a high photocatalytic activity, the preheat temperature of the first gas is preferably set at a temperature in the range of equal to or higher than 700° C. and equal to or lower than 850° C., more preferably in the range of equal to or higher than 700° C. and equal to or lower than 800° C., and even more preferably equal to or higher than 750° C. and equal to or lower than 800° C.

In regard to Examples 1, 6 and 7, a comparison was made on the characteristics of the titanium oxide particles obtainable by changing the preheat temperature of the second gas.

In Example 6 where the preheat temperature of the second gas was set at 1000° C., the photocatalytic activity and the powder yield were equivalent to those of Example 1 where the preheat temperature was set at 1100° C. In Example 7 where the preheat temperature of the second gas was set at 950° C., unreacted titanium tetrachloride remained in the downstream side of the second reaction zone A, and as a result, the powder yield was a low yield such as 60% as compared with Example 1 where the preheat temperature was set at 1100° C.

As can be seen from these results, the preheat temperature of the second gas is preferably set at a temperature in the range of equal to or higher than 950° C. and equal to or lower than 1200° C., and more preferably in the range of equal to or higher than 1000° C. and equal to or lower than 1150° C.

In regard to Examples 1 and 8 to 12, a comparison was made on the characteristics of the titanium oxide particles obtainable by changing the concentration (% by volume) of titanium tetrachloride in the first combined gas.

In Example 8 where the concentration of titanium tetrachloride in the first combined gas was adjusted to 0.08%, the proportion of rutile increased, and the photocatalytic activity decreased, as compared with Example 1 where the concentration was adjusted to 0.24%. In Examples 8 to 12 where the concentration of titanium tetrachloride in the first combined gas was adjusted to 0.24 to 8.0%, as the concentration increased, the BET value decreased. As a result, the photocatalytic activity decreased.

As can be seen from these results, the concentration of titanium tetrachloride in the first combined gas is preferably adjusted to 0.1% to 15% by volume, more preferably to 0.1% to 5% by volume, and even more preferably to 0.2% to 2% by volume.

In regard to Examples 1 and 13 to 16, a comparison was made on the characteristics of the titanium oxide particles obtainable by changing the residence time for the first combined gas in the first reaction zone to 15 to 750 milliseconds.

In Example 13 where the residence time in the first reaction zone was adjusted to 15 milliseconds, the proportion of rutile increased to a large extent, and the photocatalytic activity decreased, as compared with Example 1 where the residence time was adjusted to 150 milliseconds. In Example 16 where the residence time was adjusted to 750 milliseconds, deposit films were produced on the inner wall surface of the first reaction zone, and the powder yield decreased largely to 49%.

In Example 15 and Example 14 where the residence time in the first reaction zone was adjusted to 380 milliseconds and 250 milliseconds, respectively, deposit films were produced in small amounts on the inner wall surface of the first reaction zone, and the powder yields slightly decreased.

As can be seen from these results, the residence time for the first combined gas in the first reaction zone is preferably adjusted to the range of 30 to 400 milliseconds, more preferably to the range of 50 to 300 milliseconds, and even more preferably to the range of 100 to 200 milliseconds.

INDUSTRIAL APPLICABILITY

The invention relates to a method and an apparatus for producing metal oxide particles, and more particularly, to a method and an apparatus for the production of titanium oxide particles which produce decahedral titanium oxide particles that are suitable as a photocatalytic material, or other titanium oxide particles, by rapidly heating a combined gas composed of a metal chloride-containing gas containing titanium tetrachloride, and an oxidizing gas. The invention has applicability in the photocatalyst industry and the like.

REFERENCE SIGNS LIST 1, 8 Hollow outer cylinder
1a, 8a Upstream side
1b, 8b Downstream side
2 Insulating material (ceramic fibers)
3 Product recovery unit
3a Exhaust pump
3b Pressure regulating valve
4 First hollow inner cylinder
4a Upstream side
4b Downstream end (first junction)
5 Second hollow inner cylinder
5a Upstream side
5b Downstream end (second junction)
6 Discharge tube
7 Electric heater
11, 12 Reaction tube
15 First conduit
16 Second conduit
24 Opening of first hollow inner cylinder
25 First ring-shaped opening
26 Second ring-shaped opening
27 Opening of second hollow inner cylinder
28 Opening of hollow outer cylinder
101, 201 Apparatus for production of metal oxide particles
A Second reaction zone
B First reaction zone
C Externally heated zone
X Preheating region
Y Preheating region
Z Preheating region

The invention claimed is:

1. A method for producing decahedral titanium oxide particles, the method comprising:
combining, in a reaction tube, a preheated titanium tetrachloride-containing gas with a preheated first gas which does not contain the titanium tetrachloride at a first junction to obtain a first combined gas, and
combining the first combined gas with a preheated second gas which does not contain the titanium tetrachloride, at a second junction which is further downstream of the first junction, to obtain a second combined gas,
wherein at least one of the titanium tetrachloride-containing gas and the first gas contains oxygen,
wherein the preheated titanium tetrachloride-containing gas is further heated in a first reaction zone which is a region between the first junction and the second junction by combining the first gas with the titanium tetrachloride-containing gas at the first junction while setting the preheat temperature of the first gas at a temperature higher than the preheat temperature of the titanium tetrachloride-containing gas, and the first combined gas is further heated in a region downstream of the second junction by combining the second gas with the first combined gas at the second junction while setting the preheat temperature of the second gas at a temperature higher than the temperature of the first combined gas,
the first gas contains one or more gases selected from the group consisting of oxygen gas, nitrogen gas, and argon, the second gas contains one or more gases selected from the group consisting of oxygen gas, nitrogen gas, and argon, and the preheat temperature of the titanium tetrachloride-containing gas is equal to or higher than 500° C. and equal to or lower than 750° C., wherein an insulating material is provided in a second zone which is a region in which the first combined gas and the preheated second gas are combined to form the second combined gas, and the second combined gas flows through, wherein the insulating material is wound around the outside of the second zone so as to maintain the temperature of the gas in the second zone, and wherein no heating device is provided inside a space surrounded by the insulting material.

2. The method for producing decahedral titanium oxide particles according to claim 1, wherein the temperature of the first combined gas is equal to or higher than 700° C. and equal to or lower than 850° C.

3. The method for producing decahedral titanium oxide particles according to claim 1, wherein the temperature of the second combined gas is equal to or higher than 800° C. and equal to or lower than 1150° C.

4. The method for producing decahedral titanium oxide particles according to claim 1, wherein the preheat temperature of the first gas is equal to or higher than 700° C. and equal to or lower than 850° C.

5. The method for producing decahedral titanium oxide particles according to claim 1, wherein the preheat temperature of the second gas is equal to or higher than 950° C. and equal to or lower than 1200° C.

6. The method for producing decahedral titanium oxide particles according to claim 1, wherein the titanium tetrachloride-containing gas contains nitrogen gas.

7. The method for producing decahedral titanium oxide particles according to claim 1, wherein the concentration of titanium tetrachloride contained in the first combined gas is set at 0.1% to 15% by volume.

8. The method for producing decahedral titanium oxide particles according to claim 1, wherein the time for which the first combined gas remains in the first reaction zone is adjusted to 30 to 400 milliseconds.

9. The method for producing decahedral titanium oxide particles according to claim 1, wherein the Reynolds number of the second combined gas is adjusted to 10 to 10,000.

* * * * *